(12) United States Patent
Erickson et al.

(10) Patent No.: US 10,248,472 B2
(45) Date of Patent: Apr. 2, 2019

(54) RECURSIVE MODULARIZATION OF SERVICE PROVIDER COMPONENTS TO REDUCE SERVICE DELIVERY TIME AND COST

(71) Applicant: AT&T Intellectual Property I, L.P., Atlanta, GA (US)

(72) Inventors: Richard R. Erickson, Farmingdale, NJ (US); Basundhara Prasad, Marlboro, NJ (US); Dean Bragg, Toms River, NJ (US); Richard D. Schlichting, New Providence, NJ (US); Pamela Lilly DeFazio, Ocean, NJ (US); Adrian Vulpas, Shorewood, WI (US); John Oetting, Zionsville, PA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 14/929,793

(22) Filed: Nov. 2, 2015

(65) Prior Publication Data
US 2017/0123863 A1    May 4, 2017

(51) Int. Cl.
*G06F 3/00*    (2006.01)
*G06F 9/54*    (2006.01)

(52) U.S. Cl.
CPC ..................... *G06F 9/54* (2013.01)

(58) Field of Classification Search
CPC .......................................................... G06F 9/54
USPC ................................................ 719/310, 328
See application file for complete search history.

(56) References Cited

U.S. PATENT DOCUMENTS

| | | | |
|---|---|---|---|
| 5,774,720 A | * | 6/1998 | Borgendale ............... G06F 3/14 345/502 |
| 6,275,976 B1 | | 8/2001 | Scandura |
| 7,810,067 B2 | | 10/2010 | Kaelicke et al. |
| 8,196,114 B2 | | 6/2012 | Diao et al. |
| 8,250,521 B2 | | 8/2012 | Zhang et al. |
| 8,843,883 B2 | | 9/2014 | Chowdhary et al. |
| 8,943,010 B2 | | 1/2015 | Hutson et al. |

(Continued)

OTHER PUBLICATIONS

Kidron, Legacy system, Apr. 2015.*

(Continued)

*Primary Examiner* — Lechi Truong
(74) *Attorney, Agent, or Firm* — Hartman & Citrin LLC

(57) ABSTRACT

Concepts and technologies disclosed herein are directed to recursive modularization of service provider components to reduce service delivery time and cost. In accordance with one aspect disclosed herein, a module is executable by a hardware compute resource of a virtualization platform. The module can include a module controller and a module instance. The module controller can expose a set of application programming interfaces ("APIs"). The set of APIs can include a configuration API that collects a configuration to be utilized to instantiate the module instance. The set of APIs also can include an instance provisioning API that instantiates the module instance based upon the configuration. The set of APIs also can include one or more other APIs to manage the module instance. The module instance can be a service module instance. The service module instance can encapsulate additional service module instances that have been instantiated by another module.

17 Claims, 17 Drawing Sheets

(56) References Cited

U.S. PATENT DOCUMENTS

| | | |
|---|---|---|
| 9,009,058 B2 | 4/2015 | Erickson et al. |
| 9,317,175 B1* | 4/2016 | Lockhart ............. G06F 3/04815 |
| 9,697,061 B1* | 7/2017 | Lazier .................... G06F 9/547 |
| 2005/0114829 A1 | 5/2005 | Robin et al. |
| 2007/0214462 A1* | 9/2007 | Boillot .................. G06F 3/0304 |
| | | 719/328 |
| 2009/0182565 A1* | 7/2009 | Erickson ................ G06Q 10/06 |
| | | 705/300 |
| 2011/0167402 A1 | 7/2011 | Ahmad |
| 2014/0237443 A1 | 8/2014 | Pana et al. |
| 2014/0259030 A1* | 9/2014 | Mizuguchi ............. G01C 21/36 |
| | | 719/328 |
| 2014/0317591 A1 | 10/2014 | Rosomoff |

OTHER PUBLICATIONS

Kenneth L. Calvert, Directions in Active Networks (Year: 1998).*
Frank et al., "Towards a Generic Framework of Engineering Design Automation for Creating Complex CAD Models," International Journal on Advances in Systems and Measurements, 2014, pp. 179-192, vol. 7, No. 1 & 2.
Li et al., "Software defined environments: An introduction," IBM Journal of Research and Development, Mar./May 2014, vol. 58, No. 2/3.
Bernini et al., "VNF Pool Orchestration for Automated Resiliency in Service Chains," NFV Research Group Internet-Draft, Oct. 11, 2015, IETF Trust.

* cited by examiner

RECURSIVE MODULARIZATION OF SERVICE PROVIDER COMPONENTS TO REDUCE SERVICE DELIVERY TIME AND COST

BACKGROUND

Network Functions Virtualization (NFV) is a new technology initiative that aims to move traditional and evolving mobility networking functions like access network elements, core network elements, transport network elements, and others from purpose-built hardware to commercial-off-the-shelf ("COTS") server-based platforms. This is achieved by virtualizing mobility networking functions by creating virtual networking functions ("VNFs") that operate on COTS hardware.

Traditionally, each component—whether a VNF, service, or product—analyzes and defines component-specific requirements for the operations support systems ("OSS") and business support systems ("BSS") needs of the component, which are submitted to target OSS/BSS for realization. This requires schedule interlock with and funding for each of the supporting system teams and typically involves the creation of custom logic and interfaces that are embedded in and scattered across the many OSS/BSS systems involved, thus making the component logic very difficult to identify.

SUMMARY

By contrast to the aforementioned implementations of service design and realization, the concepts and technologies disclosed herein define a modularity abstraction that enables component modules to be created by solutioning teams, which are designed to plug into a standard OSS/BSS framework with component solutions for OSS/BSS challenges cleanly separated from the OSS/BSS systems themselves. The concepts and technologies disclosed herein further define interfaces that directly facilitate encapsulation and aggregation of lower level components (e.g., VNFs and services) by higher level components (e.g., products and product offers) without the traditional need for custom approaches to the OSS/BSS needs of the encapsulation or aggregation.

Concepts and technologies disclosed herein are directed to recursive modularization of service provider components to reduce service delivery time and cost. In accordance with one aspect of the concepts and technologies disclosed herein, a module is executable by a hardware compute resource of a virtualization platform. The module can include a module controller and a module instance. The module controller can expose a set of application programming interfaces ("APIs"). The set of APIs can include a configuration API that collects a configuration to be utilized to instantiate the module instance. The set of APIs also can include an instance provisioning API that instantiates the module instance based upon the configuration. The set of APIs also can include one or more other APIs to manage the module instance. The other APIs can provide functions such as, for example, test, metrics, reports, logs, inventory, and administrative functions. In some embodiments, the module instance can be a service module instance. The service module instance can encapsulate additional service module instances that have been instantiated by another module.

In some embodiments, the set of application programming interfaces also includes an event listener API that receives an event generated by the module instance. In some embodiments, the module controller can include a capacity event handler. In these embodiments, the event can include a capacity event that triggers the capacity event handler.

In some embodiments, the module controller can include a fault event handler. In these embodiments, the event can include a fault event that triggers the fault event handler.

In some embodiments, the module controller can include a heartbeat event handler. In these embodiments, the event can include a heartbeat event that triggers the heartbeat event handler.

In some embodiments, the module controller can include a heartbeat event handler. In these embodiments, the event can include a heartbeat event that triggers the heartbeat event handler.

In some embodiments, the module controller can include a performance event handler. In these embodiments, the event can include a performance event.

In some embodiments, the module controller can include a usage event handler. In these embodiments, the event can include a usage event.

According to one aspect of the concepts and technologies disclosed herein, a computer-readable storage medium can have instructions stored thereon that, when executed by a processor, cause the processor to perform operations. In particular, the processor can cause a service module implementation logic to be encapsulated behind a set of APIs and a set of user interfaces ("UIs") through which the set of APIs are callable. The processor can cause the set of APIs and the set of UIs to be exposed. The processor can receive, via the set of user interfaces, input to call at least a portion of the APIs.

In some embodiments, the input includes input to call at least the portion of the APIs to instantiate a new service module instance. In some other embodiments, the input includes input to call at least the portion of the APIs to manage an existing service module instance.

The set of APIs can include a configuration API that collects a configuration for the module instance. The set of APIs can include an instance provisioning API that instantiates the module instance based upon the configuration. The set of UIs can include a configuration UI through which a user provides the input to configure a service module instance. The set of UIs also can include an instance provisioning UI through which the user instantiates the service module instance. The set of APIs can include an event listener API that receives an event generated by the service module instance and provides the event to an event handler.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
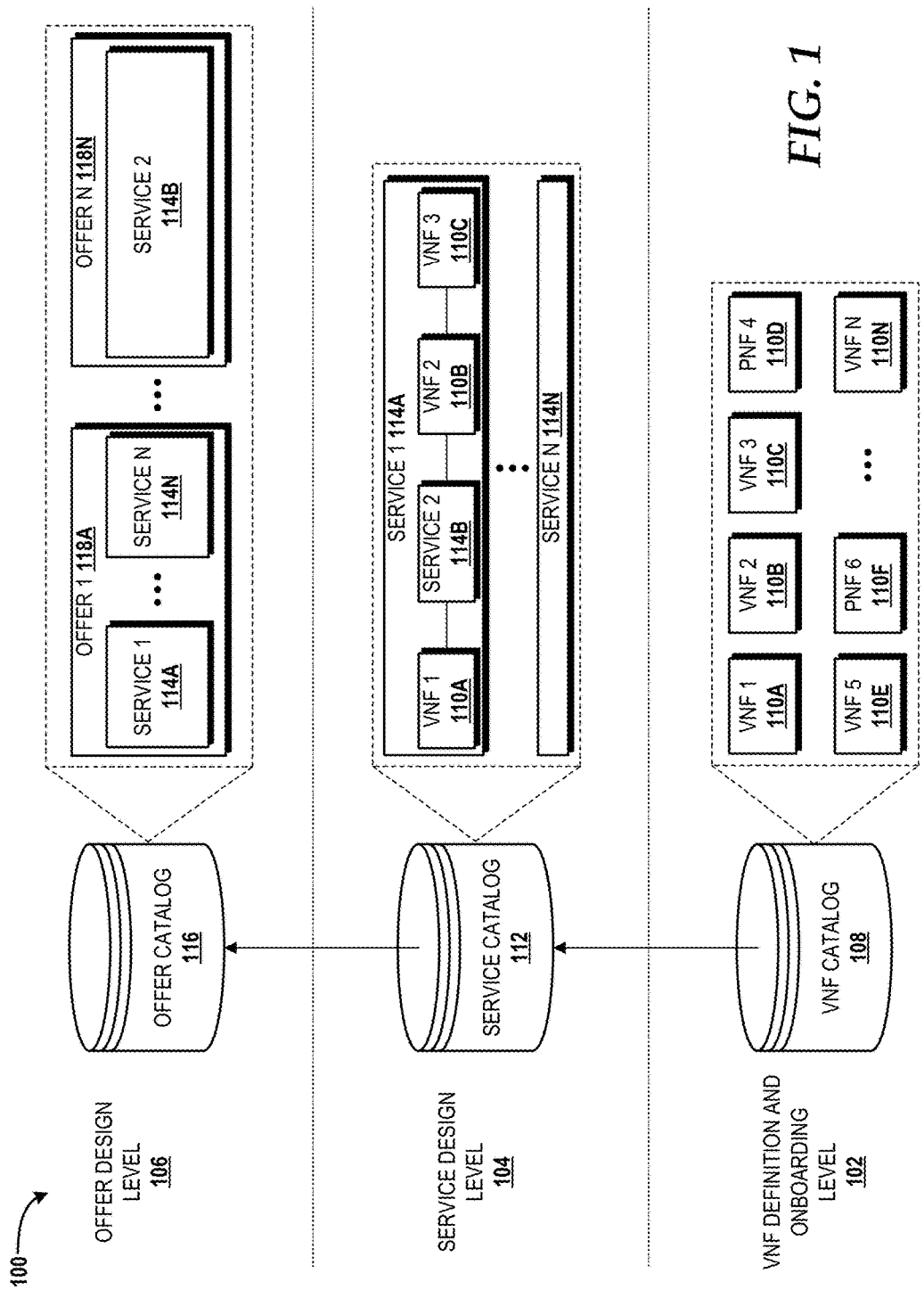
FIG. 1 is a block diagram illustrating aspects of a modularization hierarchy, according to an illustrative embodiment.

User-defined network cloud ("UDNC") promises to COTS-enable and dramatically speed up the instantiation and provisioning of components in a network. While this is a great achievement, similar progress needs to be made in the realization of customer facing offers that encompass the full Learn-Buy-Get-Use-Pay-Support ("LBGUPS") customer experience lifecycle. Unless this is done, overall service realization intervals will not accelerate and service realization will remain undesirably complex. The concepts and technologies described herein seek, at least in part, to increase reuse in the solution design process and provide strategies to eliminate pairwise software development lifecycles between services and the support systems on which the services depend.

Product offer creation starts with a vision in the mind of a product manager. The product manager contacts service design and delivery personnel to discuss the vision and explore its feasibility. To support this process, the product manager creates user stories that describe the vision in more detail. These stories are carefully reviewed with the service design and delivery organization to ensure they are clear and accurately convey the product manager's offer concept. Ultimately, a very high order magnitude cost estimate is prepared by the service design and delivery organization so that a project can be created and used to fund further work.

At this stage, there are a lot of details that are unclear and undefined. For example, the regulations and laws affecting service delivery are not likely to be well understood, particularly if the offer crosses multiple jurisdictional boundaries. The capabilities and limitations of vendor partners required to realize the solution are not likely to have been identified at this stage. The backend systems that will be used to support account management, ordering, provisioning, and billing are not likely to be clear. The types of charging detail records ("CDRs"), probes/taps, and logs that will be available and the systems that will collect, analyze and distribute those artifacts also are not likely to be clear. Options, alternatives, and work-arounds for all of the above (and possibly more) are not likely to have been considered and vetted. In short, the solution at this point is very amorphous and needs a lot of work.

Part of the complexity is due to the fact that, traditionally, there have been few clear target systems and approaches for handling of many of these solution challenges. There are multiple options for the collection, routing, and processing of information (e.g., CDRs, logs, and probes/taps) that may be required to support report generation, call trace requirements and IP mediation/billing. There are multiple options for the exposure of customer application programming interfaces ("APIs") and graphical user interfaces ("GUIs"). There are multiple options for provisioning of solution components. Where target systems have been identified by target architecture, projects do not always use these systems due to cost and time-to-market issues or simply because of the fear that delays and jeopardies of interlocking with such organizations may entail. This makes the solutioning landscape for many service providers a very complex environment.

In many service provider environments, there is no single place or repository a solution designer can go to learn about and to reuse solutions approaches pioneered by other teams. The knowledge of the tradeoffs and alternatives behind project documentation is typically locked in the minds of key contributors or posted on obscure sharepoints, wikis, or systems that do not permit access to those outside of specific teams or organizations. As a result, a significant part of the task of solutioning lies in simply identifying the right contacts to talk to, to extract the history, and to re-cover the ground that they walked as they solved related problems. This makes the creation of new solution designs unnecessarily slow and complicated, and it makes it much more difficult to onboard new solution designers who have not lived through the trials and tribulations of past solution designs.

The next phase of the offer creation process consists of preparing the solution approach, often in text document format. The solution approach summarizes the high level design and the impacts to all parts of the business. Because of the enormous complexity involved in solutioning, the preparation of this document typically takes a team of subject matter experts on the order of months to complete. As part of this work, design alternatives, vendor selections, and costs are clarified, and the product manager iteratively amends the user stories that must be supported in the initial release.

After the solution approach has been prepared and costed and the organizations involved have committed to their part of the work, the solution passes downstream to successful levels of refinement, definition, and development until a working solution has been implemented and is ready for testing. In agile development, this part of solution delivery occurs in short iterative loops called sprints which are built, tested, evaluated, and used to refine the requirements and design approach for the next sprint.

Part of the implementation challenge in the latter stages of offer creation is the creation of the LBGUPS user interface that the customer will directly experience. The product manager is typically very prescriptive and concerned about how this interface will look and feel. Legal, privacy, security, and regulatory personnel are also stakeholders of this interface, which might consist of GUIs and/or APIs supported by terms and conditions, marketing graphics, optimized sequencing, presentation, and collection of customer information. The LBGUPS user interface links the customer to the downstream systems chosen for the solution including the account management, contracting, ordering, order validation, provisioning, order status, inventory, usage, billing, health, performance, test, ticketing, and support systems.

In most cases, the logic of the implemented service is not a single module that can be pointed to and examined in one place. Rather, it is scattered in many systems behind unique project-specific APIs. There are bits of service logic in the customer portal. There are bits of service logic in the ordering systems. There are more bits in provisioning, billing, inventory, alarm processing, test, performance monitoring systems, and more. This is the very opposite of modularity. The service is spread across the enterprise in a highly complex and solution-specific way.

The concepts and technologies disclosed herein define a modularity abstraction that enables component modules to be created by solutioning teams, which are designed to plug into a standard OSS/BSS framework with component solutions for OSS/BSS challenges cleanly separated from the OSS/BSS systems themselves. The concepts and technologies disclosed herein further define interfaces that directly facilitate encapsulation and aggregation of lower level components (e.g., VNFs and services) by higher level components (e.g., products and product offers) without the traditional need for custom approaches to the OSS/BSS needs of the encapsulation or aggregation.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, mobile devices, wireless devices, multiprocessor systems, distributed computing systems, microprocessor-based or programmable consumer electronics, minicomputers, mainframe computers, routers, switches, other computing devices described herein, and the like.

As described above, offer creation is a complex and time consuming task. In order to accelerate service realization, the concepts and technologies disclosed herein utilize modularization techniques to modularize the products of the offer creation for ease of reuse even as the complexity of the modularized products is hidden. In other words, a goal of modularization is to encapsulate the logic and complexity of service functionality behind discoverable, reusable, and composable service abstractions that will become part of an ever-growing library of a service provider's service capabilities.

A goal of the modularization framework disclosed herein is to provide standard interfaces and processes around supporting systems and target approaches so that multiple pairwise software development cycles are no longer needed to incorporate supporting systems when new services are defined. In other words, a goal of the modularization framework disclosed herein is to provide standard interfaces, processes, and target systems that enable service complexity to be concentrated in service modules rather than being scattered across dozens of systems in service-specific ways.

Referring now to FIG. 1, a modularization hierarchy 100 will be described, according to an illustrative embodiment. The illustrated modularization hierarchy 100 includes a virtual network function ("VNF") definition and onboarding level 102, a service design level 104, and an offer design level 106. Each of these levels will now be described.

The VNF definition and onboarding level 102 includes a VNF catalog 108. The VNF catalog 108 contains a set of all available VNFs 110A-110N (collectively, VNFs 110). The VNFs 110 can additionally include one or more physical network functions ("PNFs"), which, from a framework software perspective, can be wrapped with interfaces that present the PNFs as VNFs. The VNFs 110 can provide fundamental network capabilities, some examples of which include, but are not limited to, firewalls, load balancers, routing elements, switching elements, combinations thereof, and the like. The VNFs 110 can support configurable attributes that affect behavior and characteristics of the VNFs 110. The VNFs 110 can conform to VNF packaging standards, including, for example, VNF recipes, VNF controller APIs, events, and formats. In order to improve the process of offer creation, the VNFs 110 can be packaged in a way that facilitates incorporation into one or more high-level service abstractions provided in the service design level 104, which will now be described.

The service design level 104 includes a service catalog 112. The service catalog 112 contains a set of all available services 114A-114N (collectively, services 114). As used herein, the services 114 are not customer facing offers but are instead modules that encapsulate one or more of the VNFs 110 and/or one or more other services (which can include one or more of the services 114) and facilitate the creation of customer facing offers provided in the offer design level 106. In the illustrated example of the service design level 104, a service 1 114A encapsulates a VNF 1 110A, a VNF 2 110B, a VNF 3 110C, and a service 2 114B. Although not shown, the service 2 114B might also encapsulate one or more of the VNFs 110 and/or one or more other services. The services 114 can support configurable attributes that affect behavior and characteristics of the services 114. The services 114 can conform to service packaging standards, including service recipes, service-specific APIs, events, and formats.

The highest level of modularization in the modularization hierarchy 100 is the offer design level 106. The offer design level 106 includes an offer catalog 116. The offer catalog 116 contains a set of all available offers 118A-118N (collectively, offers 118—also referred to herein as "products" or "product offers"). In the illustrated example of the offer design level 106, an offer 1 118A includes the service 1 114A and the service N 114N, and an offer N 118N includes the service 2 114B. The offers 118 are based on a bundle of one or more of the services 114 configured appropriately and associated with eligibility requirements, rating/pricing configurations, terms and conditions, discounts, promotions, customer experience interfaces, combinations thereof, and/or the like.

In summary, the modularization hierarchy 100 includes modules that can encapsulate other modules, extending from base VNFs (e.g., the VNFs 110) to simple service modules (e.g., the service N 114N), to complex service modules that incorporate simple services and other VNFs (e.g., the service 1 114A), and then to offer modules (e.g., the offers 118). When one module encapsulates another, that module can leverage the encapsulated module's registered application programming interfaces ("APIs") and user interfaces ("UIs") to provide the module's own set of APIs and UIs. For example, an offer aggregating a service might use, without modification, all of the APIs of a subordinate service, as will be described in greater detail herein below.

The illustrated modularization hierarchy 100 does not include any orchestration. Orchestration is a technology that can be used to execute module programming logic. Modules exist in a recursive hierarchy (i.e., the modularization hierarchy 100) at any level of which (e.g., the VNF definition and onboarding level 102, the service design level 104, and/or the offer design level 106), orchestration might be present or not (as in the illustrated embodiment). What matters for speed of service realization is ensuring that module developers (whether VNF, service, or offer developers) have the ability to develop module logic and interfaces in a do-it-yourself manner, without having to interlock and engage in joint development efforts with centralized support system teams, such as, for example, orchestration system teams or OSS/BSS teams. Joint development and pairwise testing arrangements are the bane of service realization efforts adding complexity, time, and cost. Where orchestration systems are employed, these systems can be (and in some implementations preferably are) offered in a developer-self-service or do-it-yourself manner.

Figure 2:
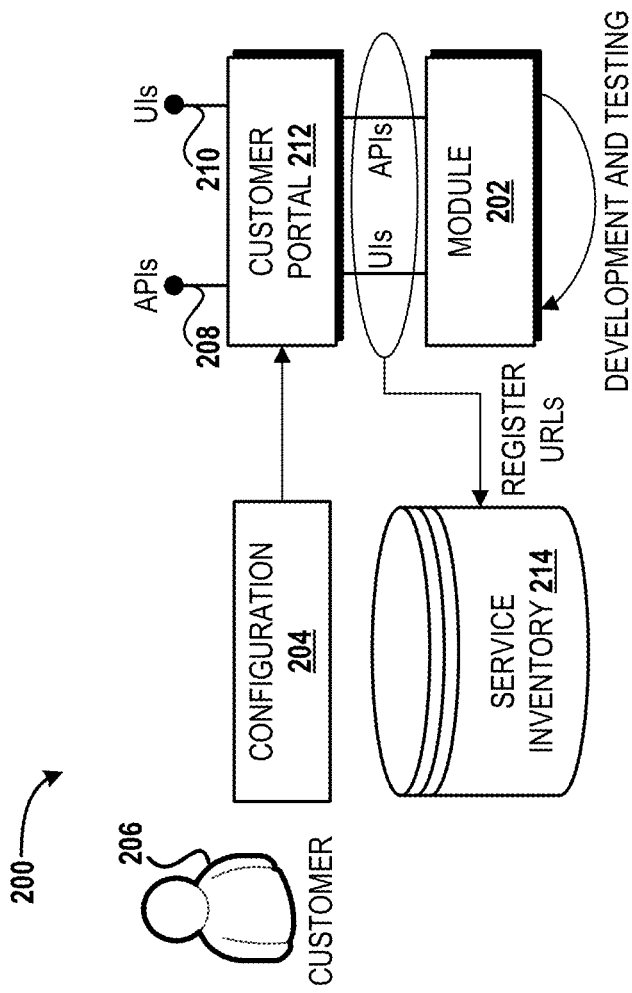
FIG. 2 is a block diagram illustrating aspects of a configuration collection implementation for a module, according to an illustrative embodiment.

Turning now to FIG. 2, a block diagram illustrating aspects of a configuration collection implementation (generally shown at 200) for a module 202, such as a VNF module, a service module, or an offer module residing in a respective one of the levels described herein above with respect to the modularization hierarchy 100 of FIG. 1, will be described, according to an illustrative embodiment. In order to be orderable, the module 202 can collect and validate a configuration 204 that will enable an instance of the module 202 to be provisioned with characteristics that meet the needs of a customer 206. To avoid interlocking with an ordering system team to develop and test configuration collection logic and interfaces, the module 202 can expose one or more configuration collection APIs 208 and one or more configuration collection UIs 210 directly. In other words, the logic of configuration collection, and the sequencing and customer presentation of the attributes involved, can be defined and understood by a solutioning team (not shown) and can become part of the modules created by the solutioning team, rather than being buried in one or more supporting systems.

The module 202 can provide or can otherwise facilitate, at least in part, a customer portal 212, through which the customer 206 can provide the configuration 204 that meets the needs of the customer 206. The configuration 204 can include one or more characteristics that the customer 206 desires for a module instance (not shown) of the module 202 to exhibit in order to support, at least in part, a service or offer that the customer 206 desires. The configuration collection implementation 200 also includes a service inventory 214, which can be or can include the service catalog 112 described herein above with reference to FIG. 1. Additionally, the service inventory 214 can support one or more uniform resource locator ("URL") fields that can be used to register URLs associated with the configuration collection API(s) 208 and the configuration collection UI(s) 210. For example, the customer portal 212 can dynamically incorporate solution ordering UI screens, solution provisioning logic, solution test and troubleshooting UI screens, and others by referencing a table of URL references contained within the service inventory 214. These URLs could be added and changed by a solution team without requiring development changes in the customer portal 212.

After the configuration 204 has been collected, the configuration 204 can be instantiated by an instance provisioning API. To avoid interlocking with a provisioning system team to develop and test provisioning logic and APIs, the module 202 can expose a provisioning API directly. In other words, the logic of provisioning the module 202 can be defined and understood by the solutioning team and can become part of the module 202, rather than being buried in one or more supporting systems.

Figure 3:
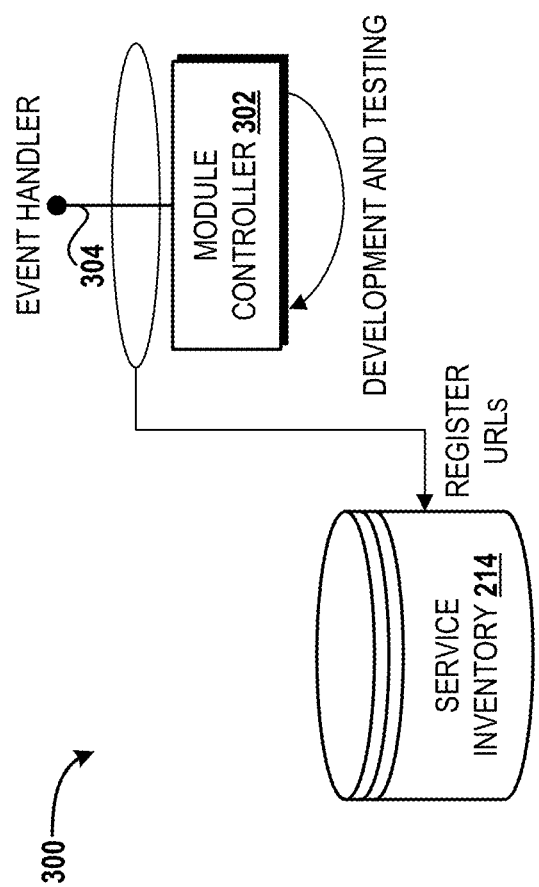
FIG. 3 is a block diagram illustrating aspects of a module event handling implementation for a module, according to an illustrative embodiment.

Turning now to FIG. 3, a block diagram illustrating aspects of a module event handling implementation (generally shown at 300) for a module, such as the module 202 introduced in FIG. 2, will be described, according to an illustrative embodiment. The module event handling implementation 300 includes the service inventory 214 introduced in FIG. 2 and a module controller 302 for controlling the module 202. The module controller 302 exposes an event handler API 304. The event handler API 304 can be or can include a capacity event handler, a heartbeat event handler, a performance event handler, a fault event handler, or some combination thereof.

A module instance might need to be scaled in/up and out/down after provisioning. To avoid interlocking with element management system ("EMS") and provisioning system teams to develop and test capacity event handler logic and APIs, the module controller 302 can expose a capacity event handler API directly. In other words, the logic of scaling a module instance and responding to capacity events can be defined and understood by the solutioning team and can become part of the module controller 302, rather than being buried in one or more supporting systems.

A module instance might need to be monitored by a watchdog process to ensure the module instance has not hung. To avoid interlocking with an EMS system team to develop and test watchdog handling of heartbeat events, the module 202 can expose a heartbeat event handler API directly. Module instances can generate heartbeat events for the module controller 302. In other words, the logic of monitoring a module instance and detecting hung conditions can be defined and understood by the solutioning team and can become part of the module controller 302, rather than being buried in one or more supporting systems.

A module instance can generate service level agreement ("SLA") and service level objective ("SLO") events, which can be processed by a performance event handler API. To avoid interlocking with an EMS system team to develop and test performance event handling logic and APIs, the module controller 302 can expose a performance event handler API directly. Module instances can generate performance events for the module controller 302. In other words, the logic of responding to SLA and SLO events can be defined and understood by the solutioning team and can become part of the module controller 302, rather than being buried in one or more supporting systems.

A module instance might need to be tested to ensure correct operation. To avoid interlocking with an EMS system team to develop and test logic and APIs in support of module instance testing, the module controller 302 can expose test APIs and UIs directly. Module instances can be subject to tests that are scheduled via the module controller 302, which executes the tests and collects the results. In other words, the logic of testing module instances can be defined and understood by the solutioning team and can become part of the module controller 302, rather than being buried in one or more supporting systems.

A module instance might fail in complex ways that need to be addressed at runtime. To avoid interlocking with EMS system team to develop and test fault event handler logic and APIs, the module controller 302 can expose a fault event handler API directly. In other words, the logic of responding to fault events can be defined and understood by the solutioning team and can become part of the module controller 302, rather than being buried in one or more supporting systems. That said, an event broker system might route fault events not only to the module controller 302, but also to OSS/BSS systems, and the module controller 302 can, in some embodiments, emit faults.

A module instance might need to present a logical inventory to clients. To avoid interlocking with an inventory system team to develop and test logic and APIs in support of inventory presentation, the module controller 302 can expose one or more inventory APIs and UIs directly. In other words, the presentation of logical inventory can be defined and understood by the solutioning team and can become part of the module controller 302, rather than being buried in one or more supporting system.

A module instance might need to generate usage, fault, SLA/SLO, capacity, heartbeat, and/or other events for various purposes, including, for example, billing, report generation, assurance, and the like. The module controller 302 can emit events in framework-standard formats for routing by event broker systems to OSS/BSS systems.

A module instance might need to generate log events for debugging and when critical conditions occur. The module controller 302 can emit log events in framework-standard formats for framework log aggregation systems. Log and usage events can be collected by event broker systems so that reports can be generated through a GUI configuration interface.

Figure 4:
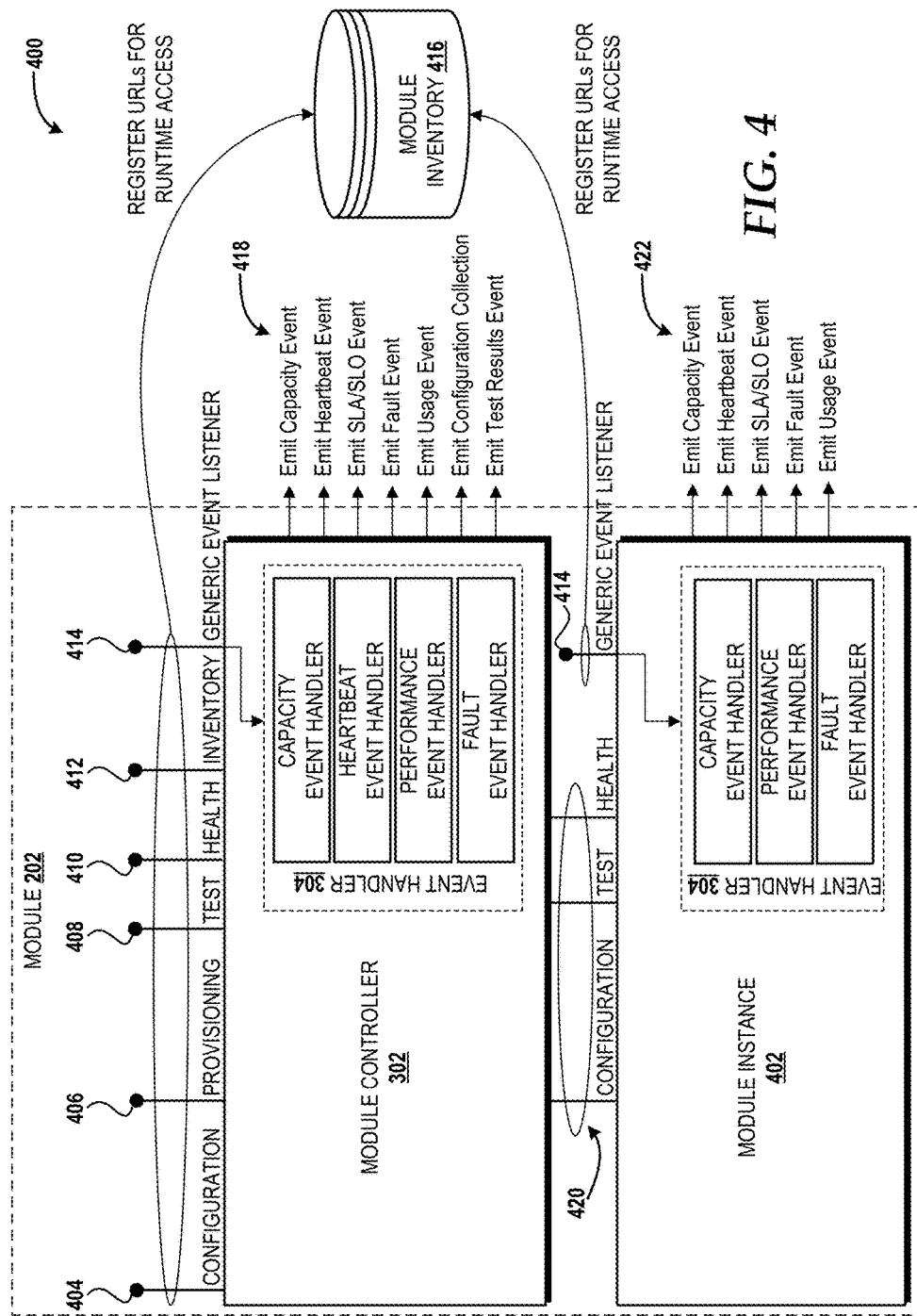
FIG. 4 is a block diagram illustrating aspects of a module architecture, according to an illustrative embodiment.

Turning now to FIG. 4, a block diagram illustrating aspects of a module architecture (generally shown at 400) for a module, such as the module 202 introduced in FIG. 2, will be described, according to an illustrative embodiment. VNF, service, and offer modules have a recursive two-part structure consisting of a module controller (illustrated as the module controller 302 introduced in FIG. 3) and a module instance 402. The module controller 302 can support one or more module instances. For ease of explanation, however, the module controller 302 will be described as supporting a single module instance—the module instance 402. The illustrated embodiment should not be construed as being limiting in any way.

The module controller 302 can expose one or more APIs as briefly described above. In the illustrated example, the module controller 302 exposes a configuration collection API 404 (such as the configuration collection API 208 introduced in FIG. 2), a provisioning API 406, a testing API 408, a health API 410, an inventory API 412, and a generic event listener API 414. URLs for the APIs and UIs can be registered in a module inventory 416.

The configuration collection API 404 allows the module 202 to be orderable. In particular, the configuration collection API 404 can collect and validate configurations (such as the configuration 204 introduced in FIG. 2) that are utilized to enable the module instance 402 to be provisioned with characteristics that meet a customer's needs. Exposure of the configuration collection API 404 avoids interlocking with an ordering system team to develop and test configuration collection logic and interfaces.

The provisioning API 406 allows the module 202 to provision/instantiate module instances, such as the module instance 402, based upon configuration data collected by the configuration collection API 404. Exposure of the provisioning API 406 avoids interlocking with a provisioning system team to develop and test provisioning logic and APIs.

The testing API 408 allows the module 202 to test module instances, such as the module instance 402, to ensure the module instance(s) is/are operating correctly. For example, a common test would allow the module 202 to assess that the module instance 402 returned, within an expected latency, the normal response and to request for a status report sent over the testing API 408. The module controller 302 can schedule tests, execute the tests, and collect results of the tests via the testing API 408. Exposure of the testing API 408 avoids interlocking with an EMS system team to develop and test logic and APIs in support of module instance testing. For example, a "call redirection service module" provides a test that enables a phone call from a test phone to be redirected to another test phone with total latency for the redirect determined including latencies through each part of the call redirection componentry. In other words, this test provides a check that the service is operating with acceptable level of performance and/or identification of service componentry that is not performing properly. Tests can be scheduled or run immediately.

The health API 410 allows the module 202 to track health of module instances, such as the module instance 402. The health API 410 can provide health information. In general, the health information can include internal error counts, statistics about duration of internal operations of interest, and/or statistics about the size of internal buffers and/or depth of work queues. The health API 410, otherwise termed a monitor API, provides current (e.g., within the last 20 seconds) metrics on the module such as call latency, call throughput, CPU usage, memory usage, and the like. The inventory API 412 allows the module 202 to present a logical inventory of the other modules (e.g., VNF modules, service modules, and/or offer modules) that the module 202 encapsulates. Exposure of the inventory API 412 avoids interlocking with an inventory system team to develop and test logic and APIs in support of inventory presentation. The inventory API 412 allows the module 202 to present a logical inventory of the multiple clients or tenants for which the module 202 provides a level of service to the other modules (e.g., VNF modules, service modules, and/or offer modules) that the module 202 encapsulates. "Logical" refers to the actual physical network and system inventory organized into abstract groupings, presented by the SDC environment, that make sense to designers. These abstract groupings are offer, service, and VNF (otherwise referred to as "resources") modules.

The generic event listener API 414 allows the module 202 to listen for and receive capacity events, instance heartbeat events, performance events, and fault events. The module controller 302 can emit events (generally shown at 418), including capacity events, heartbeat events, SLA/SLO events, fault events, usage events, configuration collection events, and test results events in framework standard formats. The module controller 302 can include one or more internal module-specific APIs to interact with one or more module instances, such as the module instance 402, that the module controller 302 has instantiated.

The module instance 402 can be controlled by the module controller 302 in module-specific ways (e.g., via module-specific internal interfaces generally shown at 420). The module instance 402 can expose a framework-standard API for event receipt (i.e., via the generic event handler 414), the URL for which can be recorded in the module inventory 416. The module instance 402 also emits events (generally shown at 422), including capacity, heartbeat, SLA/SLO, fault, and usage events.

Figure 5:
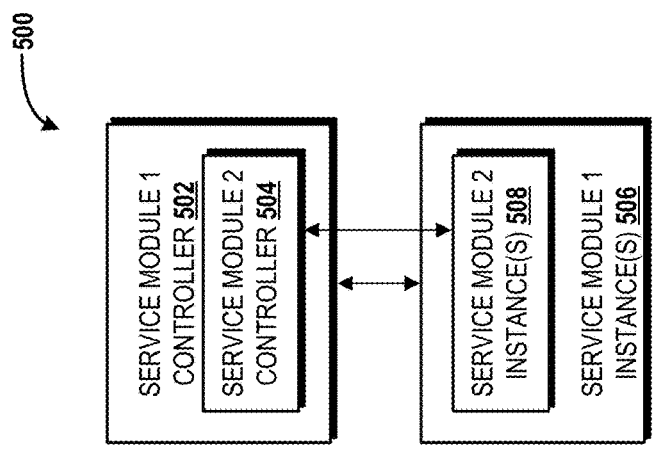
FIG. 5 is a block diagram illustrating aspects of a module encapsulation implementation for a module, according to an illustrative embodiment.

Turning now to FIG. 5, a block diagram illustrating aspects of a module encapsulation implementation (generally shown at 500) will be described, according to an illustrative embodiment. Modules can aggregate other modules in a hierarchy that extends from base VNFs to simple service modules, to complex service modules (which incorporate simple services and other VNFs), and then to offer modules. This concept is described in further detail above with reference to the modularization hierarchy 100 of FIG. 1.

The illustrated module encapsulation implementation 500 includes a service module 1 controller 502 that encapsulates a service module 2 controller 504. The service module 1 controller 502 and the service module 2 controller 504 both can be configured like the module controller 302 introduced in FIG. 3 and further described above with reference to FIG. 4. The service module 1 controller 502 controls operations of one or more service module 1 instances 506 that, in turn, encapsulate one or more service module 2 instances 508. The service module 1 instances 506 and the service module 2 instances 508 both can be configured like the module instance 402 described above with reference to FIG. 4. When one module encapsulates another, the module that encapsulates can leverage the encapsulated module's registered APIs and UIs to offer its own APIs and UIs. For example, an offer encapsulating a service can use, without modification, all of the APIs of the subordinate service.

Figure 6:
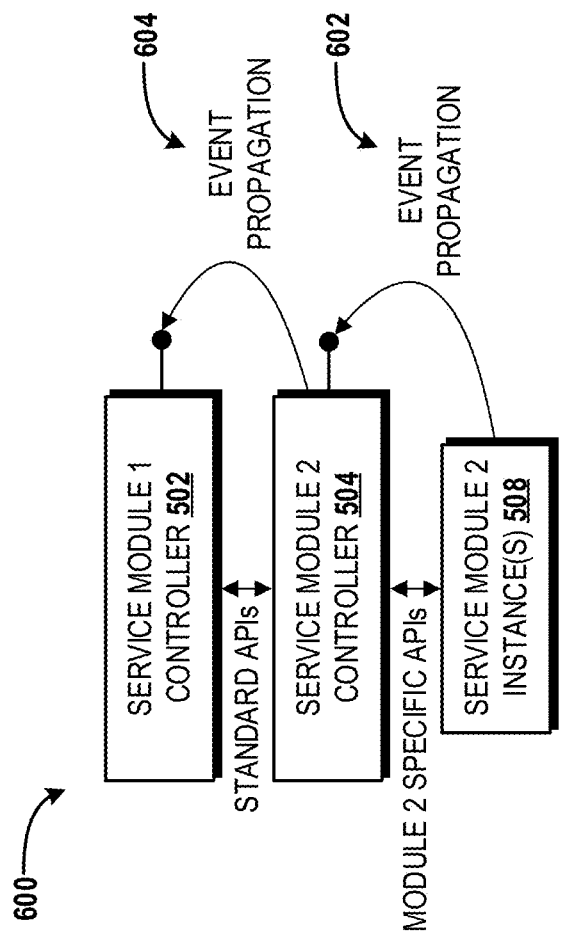
FIG. 6 is a block diagram illustrating aspects of an event propagation implementation for a module, according to an illustrative embodiment.

Turning now to FIG. 6, a block diagram illustrating aspects of an event propagation implementation (generally shown at 600) for a module will be described, according to an illustrative embodiment. When events are generated by an instance of a subordinate service, the events are first received and processed by that module's controllers. As part of that event processing, the subordinate module may emit new events that will be received by the encapsulating module's controller. The encapsulating module's controller may correlate those events with events received from other modules before deciding whether to emit its own events. Note that event subscriptions and routing can be set up via the event broker system when modules and instances are instantiated.

In the illustrated example, the event propagation implementation 600 includes the service module 1 controller 502, the service module 2 controller 504, and the service module 2 instance(s) 508 introduced in FIG. 5. In the illustrated example, the service module 2 instance(s) 508 propagate one or more events (event propagation generally shown at 602) to the service module 2 controller 504 that, in turn, propagates the event(s) (event propagation generally shown at 604) to the service module 1 controller 502.

Figure 7:
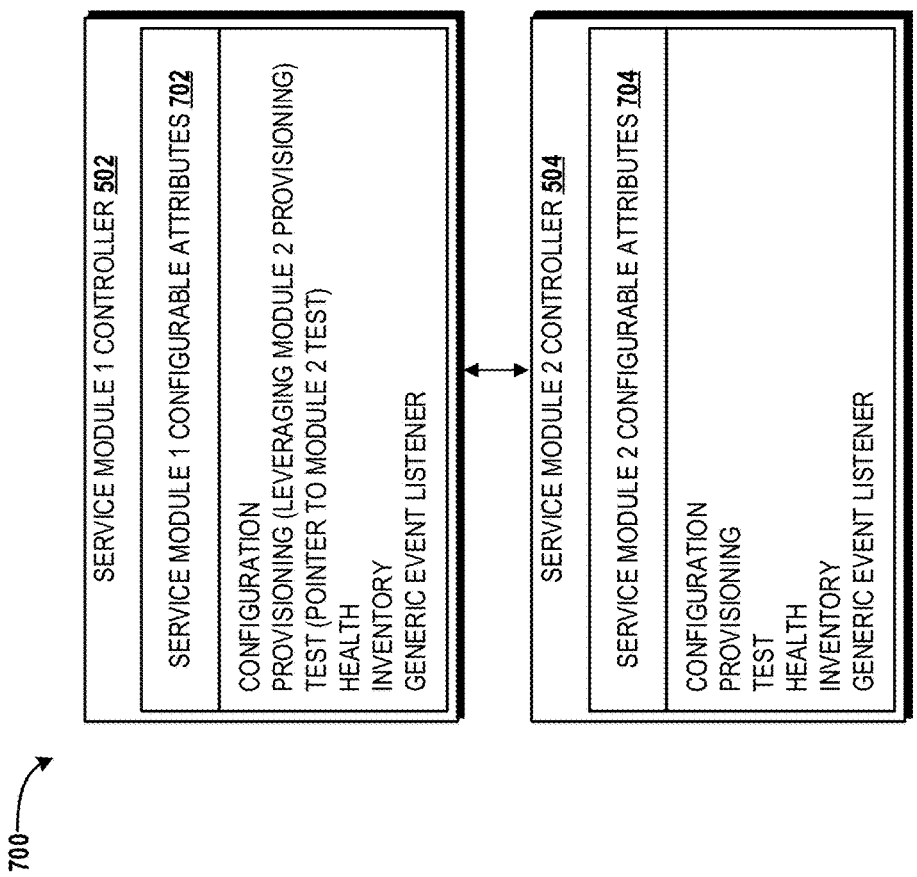
FIG. 7 is a block diagram illustrating aspects of a logical model for a module, according to an illustrative embodiment.

Turning now to FIG. 7, a block diagram illustrating aspects of a logical model 700 for a module, such as the module 202 introduced above in FIG. 2, will be described, according to an illustrative embodiment. The logical model 700 includes the service module 1 controller 502 and the service module 2 controller 504 (both introduced above in FIG. 5). The service module 1 controller 502 includes service module 1 configurable attributes 702. The service module 2 controller 504 includes service module 2 configurable attributes 704. The breadth of the configurable attributes (702, 704) can be wide and vary given a specific module's functionality. As one simple example, a module can provide as configurable attributes (re)settable values for upper/lower limits of the amount of memory or storage that the module is allowed to allocate. Additional upper/lower thresholds values might also be configured with a special (configurable) action to be taken when a threshold is reached. The action might be to generate and provide a notification message when the upper threshold is reached to a configurable (address) (e.g., of a module instance with the service module 1 configurable attributes 702).

By way of example, service module 1 can be a mobile call recording service which can enable financial services firms to legally record conversations of their employees on financial service firm corporate mobile phones. Instances of this service can be provisioned based on several configurable attributes including, for example, corporate mobile phone numbers in scope, location to which recordings should be delivered, clients allowed to access recordings, and types of audible indications used to inform callers that they are being recorded. Service module 2 can be a call redirection service, which is used by the mobile call recording service above to redirect calls to and from mobile phone numbers to a designated destination. The mobile call recording service configures the call redirection service for its needs. Configuration attributes (or parameters), in this example, can include session initiation protocol ("SIP") destination URL (which for the mobile call recording service is the call recording server), and a list of mobile phone numbers in scope. Note that the list of phone numbers collected for the mobile call recording service is used to properly configure call direction. The mobile call recording service implementation also defines the SIP destination URL.

Figure 8:
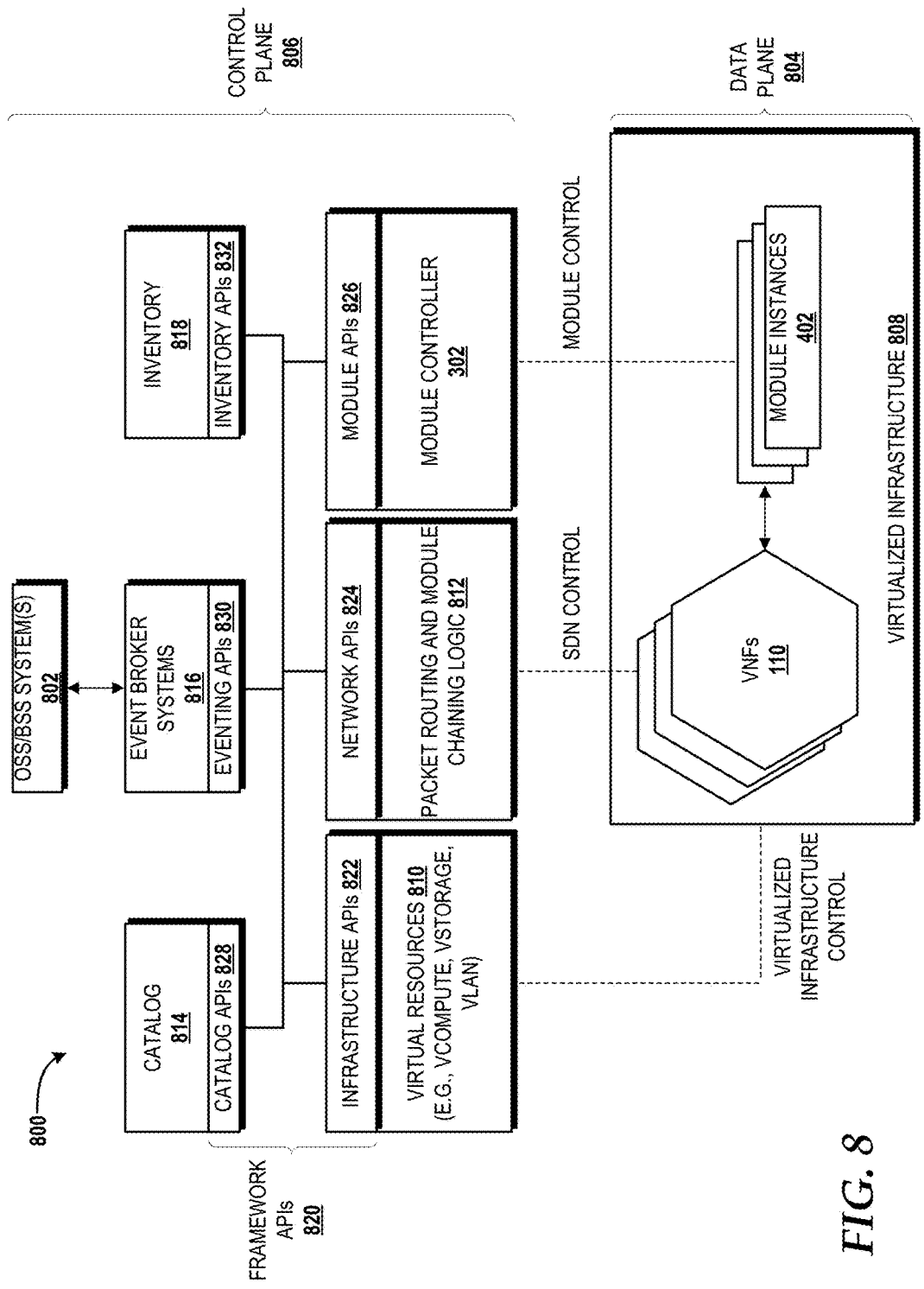
FIG. 8 is a block diagram illustrating aspects of a framework for implementing aspects of the concepts and technologies disclosed herein, according to an illustrative embodiment.

Turning now to FIG. 8, a block diagram illustrating aspects of a framework 800 for implementing aspects of the concepts and technologies disclosed herein will be described, according to an illustrative embodiment. Traditionally, a vendor or service team would create a functional module of some sort and work with various system teams over a period of time (typically one to two years) to create the interfaces and logic necessary to instantiate and manage the functional module. A goal of framework modularization is to eliminate the pairwise module-to-system-team development lifecycles that used to exist, and to replace the interfaces with framework-standard ways of interfacing to these systems, which the module team can support independently (i.e., do-it-yourself), without having to suffer through any pairwise development lifecycles.

In the framework 800 illustrated in FIG. 8, a presumption is that a module development team best understands an architecture and, as a result, is empowered to define the best way to instantiate the architecture, to scale the architecture up or down, to manage faults and other problems, to test the architecture, and to represent the state of a logical inventory of the architecture. The module development team is also empowered to deliver a functionally complete and useable module without being required to interlock with the development teams of any supporting systems. The framework 800 provides to the module developer standard events and APIs (supported by policy) that enable interaction with OSS/BSS systems 802 without the need for pairwise development efforts.

The illustrated framework 800 includes a data plane 804 and a control plane 806. The general concepts of data and control planes are generally known and therefore are not described in greater detail herein. The illustrated data plane 804 includes a virtualized infrastructure 808 that includes one or more VNFs, such as one or more of the VNFs 110 introduced in FIG. 1, and one or more module instances, such as the module instance 402 introduced in FIG. 4.

The illustrated control plane 806 includes virtual resources 810 upon which the virtualized infrastructure 808 can operate. The virtual resources 810 can be provided by any virtualization platform and can include virtual compute ("vCompute"), virtual storage ("vStorage"), and virtual LAN ("vLAN") resources, for example. In some embodiments, the virtual resources 810 are provided, at least in part, via a network virtualization platform ("NVP"), an illustrative embodiment of which is provided herein below with reference to FIG. 17. The control plane 806 also includes packet routing and module chaining logic 812 for instructing the VNFs 110 how to route packets between modules in module chains. The control plane 806 also includes a module controller, such as the module controller 302 introduced in FIG. 3. The module controller 302 controls the module instances 402 in the virtualized infrastructure 808.

The virtual resources 810, the packet routing and module chaining logic 812, and the module controller 302 can interface with a catalog 814, one or more event broker systems 816, and an inventory 818. These components can each expose APIs that form a set of framework APIs 820, including infrastructure APIs 822, network APIs 824, module APIs 826, catalog APIs 828, eventing APIs 830, and inventory APIs 832.

The infrastructure APIs 822 facilitate dynamic management of cloud/virtual resources. The infrastructure APIs 822 can include OPENSTACK APIs to setup cloud resources, including, for example, cloud compute VMs and VLANs.

The network APIs 824 facilitate dynamic management of network communication paths and endpoints. The network APIs 824 can include SDN APIs used to configure the network: for example, to create VPNs with specific bandwidth and other characteristics, to spawn firewalls and to redirect traffic therethrough, and to redirect flows and connect endpoints across a wide area network.

The module APIs 826 can include the event handler API 304 (FIG. 3), the configuration API 404, the provisioning API 406, the testing API 408, the health API 410, the inventory API 412, and the generic event listener API 414 (all FIG. 4). The catalog APIs 828 facilitate access to models used to drive the instantiation and life cycle management of SDN/NFV-based services. The catalog APIs 828 can provide access to the catalog of offers, services and VNFs (collectively, resources) including construction, configurable parameters, supported tests, metrics, reports, and administrative variables (such as default configuration settings for VNFs).

The eventing APIs 830 provide access to event broker systems and include APIs to register event topics, subscribe to the topics, publish events and get events.

The inventory APIs 832 facilitate access to querying and updating the inventory tracking the SDN and any hosted service instances. The inventory APIs 832 provide access to inventory systems, which keeps track of (i.e., provides get and set access to) what has actually been instantiated in the network including offers, services and VNFs (collectively, resources) including their instantiated configurations.

Figure 9:
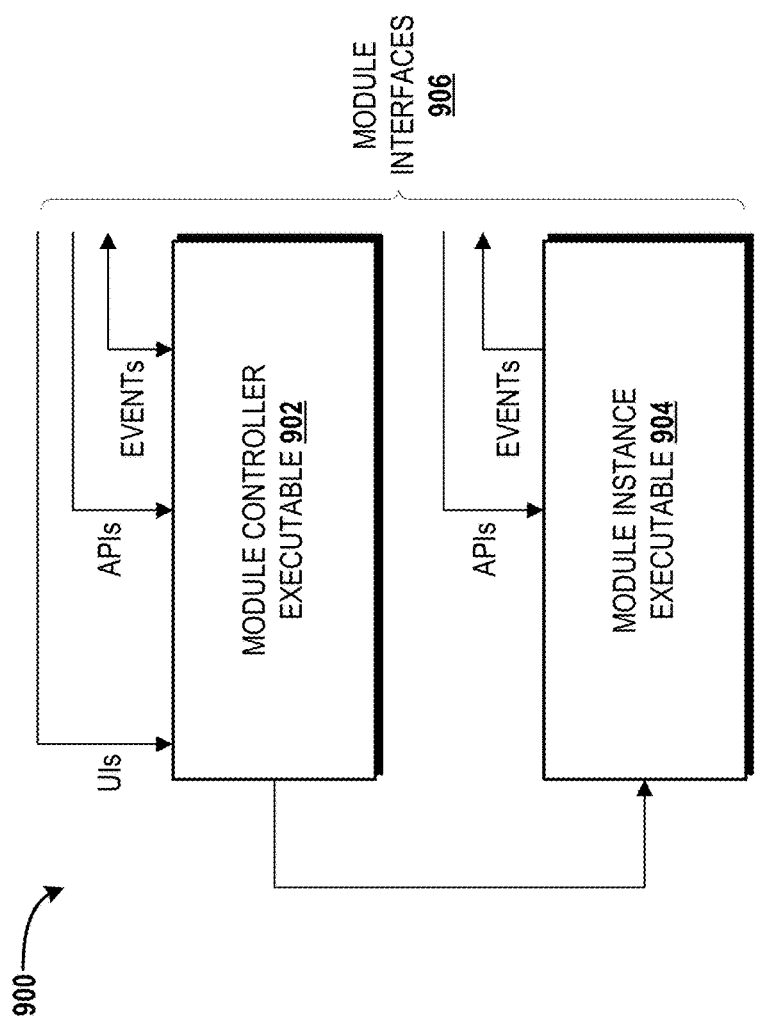
FIG. 9 is a block diagram illustrating aspects of an executable driven module package, according to an illustrative embodiment.

Turning now to FIG. 9, a block diagram illustrating aspects of an executable driven module package (generally shown at 900) will be described, according to an illustrative embodiment. The executable driven module package 900 includes a module controller executable 902 and a module instance executable 904. The module controller executable 902 and the module instance executable 904 can be provided as executable images. The module controller executable 902 and the module instance executable 904 provide the API, event handler, and UI interfaces (collectively, the module interfaces 906). The URL(s) for the module interfaces 906 are registered in inventory upon/after instantiation. The module controller executable 902 and the module instance executable 904, in the case of a VNF, are what a vendor would actually deliver to the service provider and would constitute a complete working module that can be certified and deployed. The module controller executable 902 and the module instance executable 904 can consume and depend on framework APIs (such as the set of framework APIs 820). The events, UIs, and APIs, can conform to framework standards. Table 1 below provides an example of an executable driven module package. It should be understood that this example is merely illustrative and therefore should not be construed as limiting in any way.

TABLE 1

| Executable Driven Module Package | | | | |
|---|---|---|---|---|
| Functional Area | API | Event | Executable Logic | UI |
| Capacity | | Capacity (controller and instance both receive/emit) | Controller/ Instance Event Handler | |
| Configuration Collection | get/set/ delete | UiConfigComplete (controller emits) | Controller API and UI | get/set/delete |
| Fault | | Fault (controller and instance both receive/emit) | Controller/ Instance Event Handler | |
| Generic Event Listener | notify | | Controller/ Instance Event Interface | |
| Health | get | Heartbeat (controller receives and instance emits) | Controller API, UI and Event Handler | get |
| Inventory | get | | Controller API and UI | get |
| Normal Use | | | Instance Image | |
| Performance | get | SLA/SLO (controller instance both receive/emit) | Controller API/UI, Controller/ Instance Event Handler | get |
| Provisioning | get/set/ delete | | Controller API | get/set/delete |
| Test | get/set/ delete | TestComplete (controller emits) | Controller API and UI | get/set/delete |
| Usage | | Usage (instance emits) | | |

Figure 10:
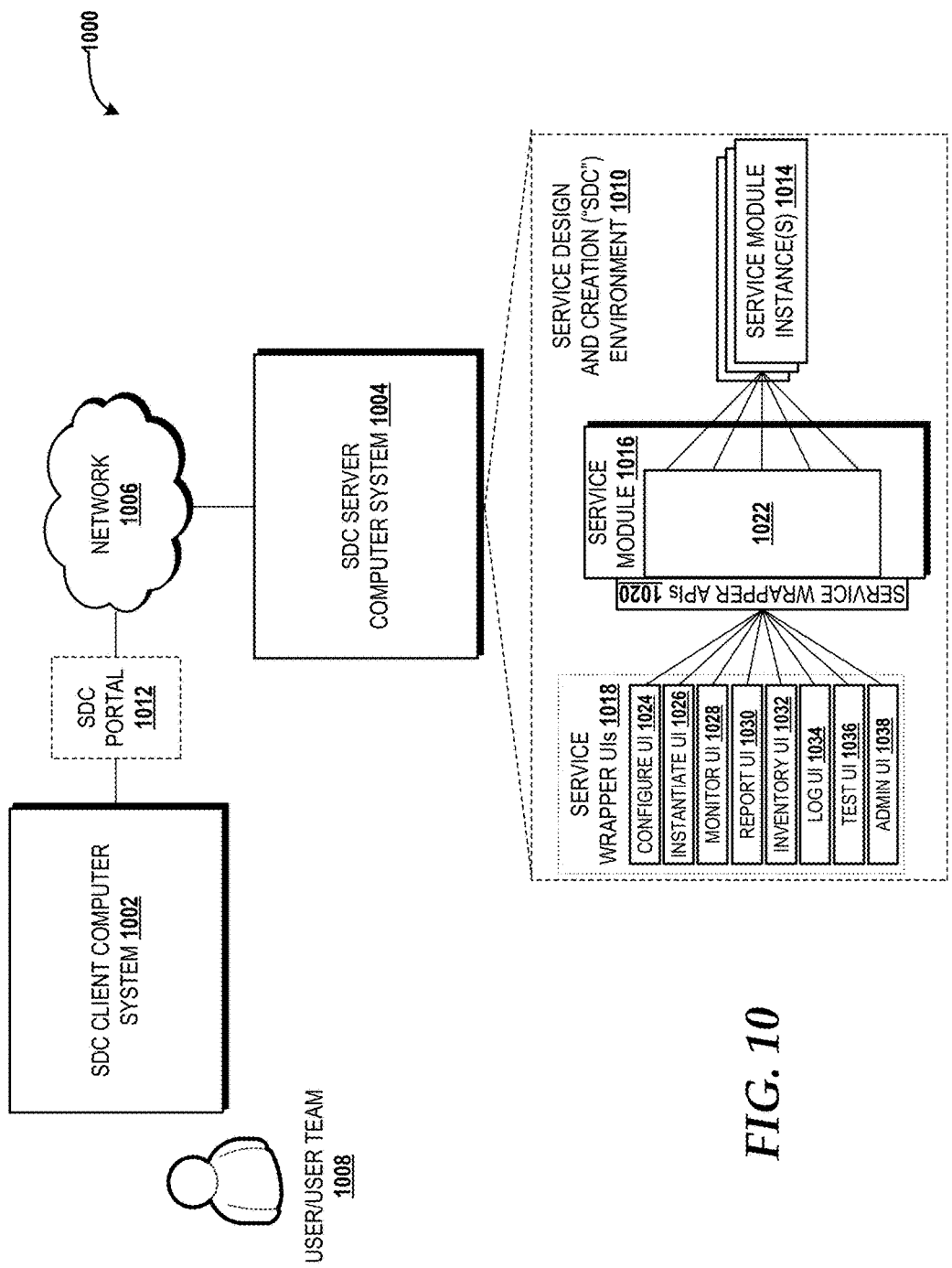
FIG. 10 is a block diagram illustrating aspects of an operating environment in which the concepts and technologies disclosed herein can be implemented.

Turning now to FIG. 10, a block diagram illustrating aspects of an operating environment 1000 in which the concepts and technologies disclosed herein can be implemented will be described. The operating environment 1000 includes a service design and creation ("SDC") client computer system 1002 and an SDC server computer system 1004 operating in communication with and/or as part of a communications network ("network") 1006. The network 1006 may be or may include a wired network, a wireless network, or a combination thereof. In some embodiments, the network 1006 is or includes a local area network ("LAN") or a wide area network ("WAN"). In some embodiments, the network 1006 is or includes the Internet. In some embodiments, the network 1006 is or includes an intranet.

According to various embodiments, the functionality of the SDC client computer system 1002 may be provided by one or more desktop computers, mobile telephones (e.g., smartphones), laptop computers, tablet computing devices, other computing systems/devices, and the like. The functionality of the SDC server computer system 1004 may be provided by one or more server computers, desktop computers, mobile telephones (e.g., smartphones), laptop computer, tablet computing devices, other computing systems/ devices, and the like. It should be understood that the functionality of the SDC client computer system 1002 and the functionality of the SDC server computer system 1004 can be provided by a single device, by two similar devices, and/or by two or more dissimilar devices. For purposes of describing some of the concepts and technologies disclosed herein, the SDC client computer system 1002 is described herein as a personal computer and the SDC server computer system 1004 as a server computer. It should be understood that this embodiment is illustrative, and should not be construed as being limiting in any way. Moreover, although a client-server network architecture is described, other architectures are contemplated, and in some embodiments, the functionality of the SDC client computer system 1002 and/or the SDC server computer system 1004 can be accessed directly, for example, by a user/user team 1008.

The user/user team 1008 can utilize the SDC client computer 1002 to access an SDC environment 1010 through an SDC portal 1012 to instantiate and manage one or more service module instances ("service module instance(s) 1014") of one or more service modules ("service module(s) 1016"). The SDC environment 1010 provides a service design and testing sandbox.

The user/user team 1008 can be or can include a product support team or a portion thereof (e.g., ordering and provisioning systems user(s)) that need to instantiate the service module instance(s) 1014 for one or more specific customers. The user/user team 1008 can be or can include one or more product development teams or a portion thereof who need to develop and test the service module instance(s) 1014 of the service module(s) 1016 prior to deployment. The user/user team 1008 can be or can include one or more operations teams or a portion thereof who need to manage the service module instance(s) 1014 that have been deployed and are supporting one or more customers. The user/user team 1008 can be or can include one or more operations teams or a portion thereof who need to deploy service modules, such as the service module 1016, in a production network outside of customer provisioning.

The service module 1016 can be configured like the module 202 introduced in FIG. 2. The service module 1016 encapsulates (hides) service and resource complexity behind a standard set of service wrapper UIs ("service wrapper UIs 1018") that call a standard set of service wrapper APIs ("service wrapper APIs 1020"). This construct allows the user/user team 1008 to reuse complex service implementations (generally shown at 1022) by calling one or more associated APIs of the service wrapper APIs 1020.

The service wrapper UIs 1018 can be hosted by the SDC environment 1010 provided by the SDC server computer system 1004. The service wrapper UIs 1018 can conform to standard requirements. For example, the service wrapper UIs 1018 can be designed to be embedded in iFrames and follow standard ways of communicating with parent iFrames. The service wrapper UIs 1018 provide a way for human users to immediately use the service wrapper APIs 1020 when instantiating and managing service module instances (e.g., the service module instances 1014). The service wrapper UIs 1018 aid in demonstrating the service module concept for executives, product teams, architects, and others (e.g., the user/user team 1008).

The service wrapper APIs 1020 can include a configuration API that exposes a configure UI 1024 through which the user/user team 1008 can create and manage service module configurations (e.g., the configuration 204 introduced in FIG. 2). A summary of the configuration API is provided below in Table 2.

TABLE 2

| Operation | Resource | Description |
| --- | --- | --- |
| POST | {serverRoot}/{serviceName}/ configuration/v1 | Creates a new service module configuration |
| GET | {serverRoot}/{serviceName}/ configuration/v1/{configID} | Gets a previously defined service module configuration |
| PUT | {serverRoot}/{serviceName}/ configuration/v1/{configID} | Updates a previously defined service module configuration |
| DELETE | {serverRoot}/{serviceName}/ configuration/v1/{configID} | Deletes a previously defined service module configuration |

The service wrapper APIs 1020 can include an instantiate API that exposes an instantiate UI 1026 through which the user/user team 1008 can create and manage service module instances (e.g., the service module instance(s) 1014). A summary of the instantiate API is provided below in Table 3.

TABLE 3

| Operation | Resource | Description |
| --- | --- | --- |
| POST | {serverRoot}/{serviceName}/ instance/v1/ | Creates a new service module instance |
| PUT | {serverRoot}/{serviceName}/ instance/v1/{instanceID} | Makes changes to an existing service module instance |
| DELETE | {serverRoot}/{serviceName}/ instance/v1/{instanceID} | Deletes an existing service module instance |

The service wrapper APIs 1020 can include a monitor API that exposes a monitor UI 1028 through which the user/user team 1008 can monitor the current health and metrics of service module instances (e.g., the service module instance(s) 1014). A summary of the monitor API is provided below in Table 4.

TABLE 4

| Operation | Resource | Description |
|---|---|---|
| GET | {serverRoot}/{serviceName}/monitor/v1/{instanceID} | Gets the health and current metrics of a service module instance |

The service wrapper APIs 1020 can include a report API that exposes a report UI 1030 through which the user/user team 1008 can view metrics of service module instances (e.g., the service module instance(s) 1014). A summary of the monitor API is provided below in Table 5.

TABLE 5

| Operation | Resource | Description |
|---|---|---|
| GET | {serverRoot}/{serviceName}/reports/v1/{instanceID} | Gets service module instance metrics over a date/time range |

The service wrapper APIs 1020 can include an inventory API that exposes an inventory UI 1032 through which the user/user team 1008 can get the logical or physical inventor of service module instances (e.g., the service module instance(s) 1014). A summary of the inventory API is provided below in Table 6.

TABLE 6

| Operation | Resource | Description |
|---|---|---|
| GET | {serverRoot}/{serviceName}/inventory/v1/{instanceID} | Gets the inventory of service module instances |

The service wrapper APIs 1020 can include a log API that exposes a log UI 1034 through which the user/user team 1008 can get operational logs associated with service module instances (e.g., the service module instance(s) 1014). A summary of the log API is provided below in Table 7.

TABLE 7

| Operation | Resource | Description |
|---|---|---|
| GET | {serverRoot}/{serviceName}/log/v1/{instanceID} | Gets the operational logs for a service module instance |

The service wrapper APIs 1020 can include a test API that exposes a test UI 1036 through which the user/user team 1008 can manage the testing of service module instances (e.g., the service module instance(s) 1014). A summary of the test API is provided below in Table 8.

TABLE 8

| Operation | Resource | Description |
|---|---|---|
| POST | {serverRoot}/{serviceName}/test/v1/{instanceID} | Schedules or immediately runs a service module instance test |
| GET | {serverRoot}/{serviceName}/test/v1/results/{instanceId}/tests/{testid}/results | Gets the results of a scheduled service module instance test |
| DELETE | {serverRoot}/{serviceName}/test/v1/{instanceId/tests/{testId} | Deletes a scheduled service module instance test |

The service wrapper APIs 1020 can include an admin API that exposes an admin UI 1038 through which the user/user team 1008 can manage administrative options for a service module (e.g., the service module 1016). A summary of the admin API is provided below in Table 9.

TABLE 9

| Operation | Resource | Description |
|---|---|---|
| POST | {serverRot}/{serviceName}/admin/v1/variable | Creates a new service module administrative name value pair setting |
| GET | {serverRoot}/{serviceName}/admin/v1/variable | Gets all previously defined service module admin name value pair settings |
| PUT | {serverRoot}/{serviceName}/admin/v1/variable | Updates a previously defined service module name value pair setting |
| DELETE | {serverRoot}/{serviceName}/ | Deletes a previously defined service module name value pair setting |
| POST | {serverRoot}/{serviceName}/admin/v1/control | Starts, stops, suspends or resumes the service module |

The service wrapper APIs 1020 can include an event listener API. A summary of the event listener API is provided below in Table 10.

TABLE 10

| Operation | Resource | Description |
|---|---|---|
| POST | {serverRot}/{serviceName}/eventListener/v1 | Publishes an event to a service module instance |

FIG. 10 illustrates one SDC client computer system 1002, one SDC server computer system 1004, one network 1006, one user/user team 1008, one SDC environment 1010, one SDC portal 1012, and one service module 1016. It should be understood, however, that various implementations of the operating environment 1000 include multiple SDC client computer systems 1002, multiple SDC server computer systems 1004, multiple networks 1006, multiple users/user teams 1008, multiple SDC environments 1010, multiple SDC portals 1012, and/or multiple service modules 1016. As such, the illustrated embodiment should be understood as being illustrative, and should not be construed as being limiting in any way.

Figure 11:
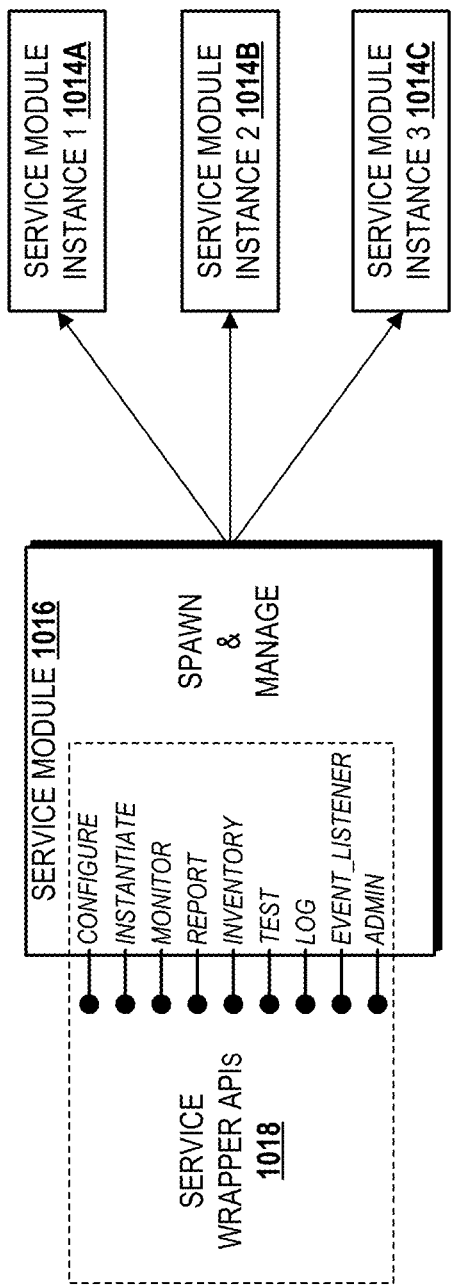
FIG. 11 is a block diagram illustrating aspects of a service module, according to an illustrative embodiment.

Turning now to FIG. 11, a block diagram illustrating aspects of a service module, such as the service module 1016 introduced in FIG. 10 will be described, according to an illustrative embodiment. Some examples of the services that the service module 1016 might provide include layer 3 to layer 4 connectivity, 3G mobile call redirection, and a session border gateway. The service module 1016 can be used to provide, at least in part, other services not specifically mentioned herein. As such, the aforementioned example services should not be construed as being limiting in any way.

The service module 1016 exposes the service wrapper APIs 1018 introduced above in FIG. 10. The illustrated service wrapper APIs 1018 include a configure API, an instantiate API, a monitor API, a report API, an inventory API, a test API, a log API, an event listener API, and an admin API. Summaries of these APIs are provided above in the description of FIG. 10.

The service wrapper APIs 1018, in some embodiments, provide a standardized set of modular APIs that each service module (e.g., the service module 1016) exposes in the same standard way. The service wrapper APIs 1018 expose the useful functionality of service modules to product support systems, product teams (e.g., the user/user team 1008 in FIG. 10), operations, and/or the like. Moreover, the service wrapper APIs 1018 hide (i.e., encapsulate) an implementation (best shown in FIG. 12).

In some embodiments, such as those in the summaries provided above, the service wrapper APIs 1018 include representational state transfer ("REST") APIs that have a set of input parameters and a set of output parameters and that can be operated using a standard verb set, including, for example, verbs such as GET, POST, PUT, and DELETE.

The service module 1016 is deployed prior to instantiation of the service module instances 1014. The illustrated service module 1016 has been deployed and has instantiated the service module instances 1014, including a service module instance 1 1014A, a service module instance 2 1014B, and a service module instance 3 1014C. Each of these instances can conform to different configurations received via the configure API.

Figure 12:
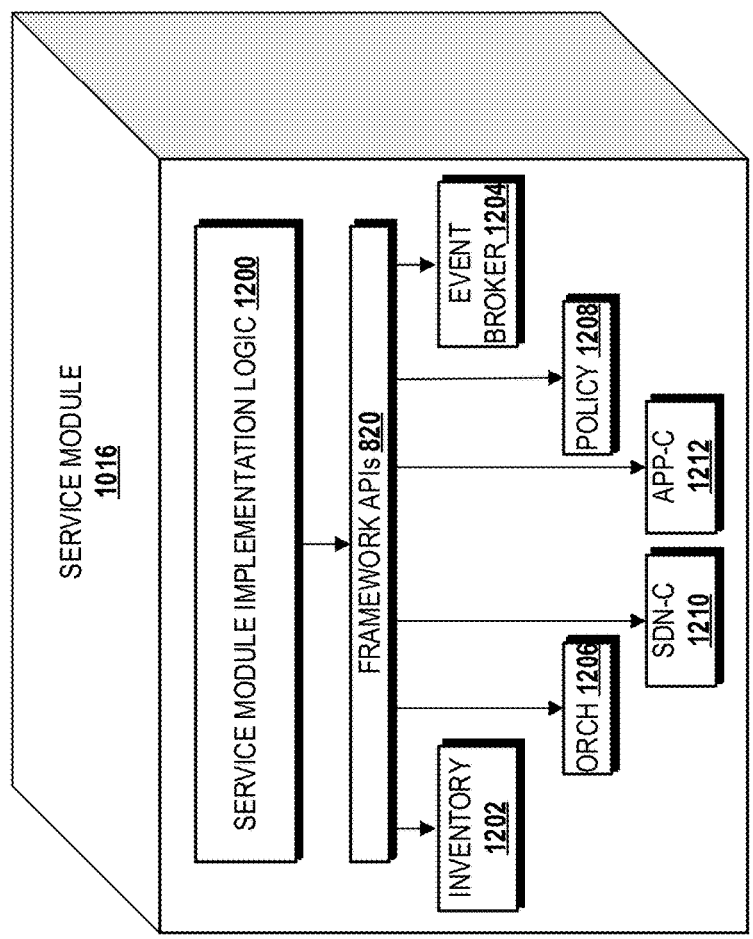
FIG. 12 is a block diagram illustrating additional aspects of a service module, according to an illustrative embodiment.

Turning now to FIG. 12, a block diagram illustrating additional aspects of a service module, such as the service module 1016, will be described, according to an illustrative embodiment. The illustrated service module 1016 includes a service module implementation logic 1200 and a set of framework APIs, such as the framework APIs 820 introduced in FIG. 8. The framework APIs 820 encapsulate the complexity of a target network architecture with which the service module 1016 can interact. Module designers and developers, whether inside a company or outside, should understand the framework APIs 820 in order to create modules that will work in a service provider's target architecture.

The service module implementation logic 1200 can be instantiated in elements such as, but not limited to, orchestration systems, SDN controllers, application controllers, and module-specific executables. The concept of modularity does not consider how a module is implemented (i.e., what is included in the service module 1016 abstract described herein) so modules can be delivered by vendors using third generation languages (e.g., JAVA) and legacy implementation approaches (e.g., not using an MSO). The illustrated service module implementation logic 1200 understands how to call the framework APIs 820 hosted by an inventory system (e.g., the inventory 818) 1202, an event broker (such as one of the event broker systems 816) 1204, an orchestration system ("ORCH") 1206, a policy system ("POLICY 1208"), an SDN controller ("SDN-C 1210), and an application controller ("APP-C 1212"). The inventory system 1202 allocates and maintains a hierarchical tree of resource identifiers ("IDs"). The event broker 1204 distributes and delivers events. The ORCH 1206 allocates VMs and VLANs using the SDN-C 1210 and the APP-C 1212. The SDN-C 1210 manages WAN connections. The APP-C 1212 manages applications. The POLICY 1208 affects implementation options.

Figure 13:
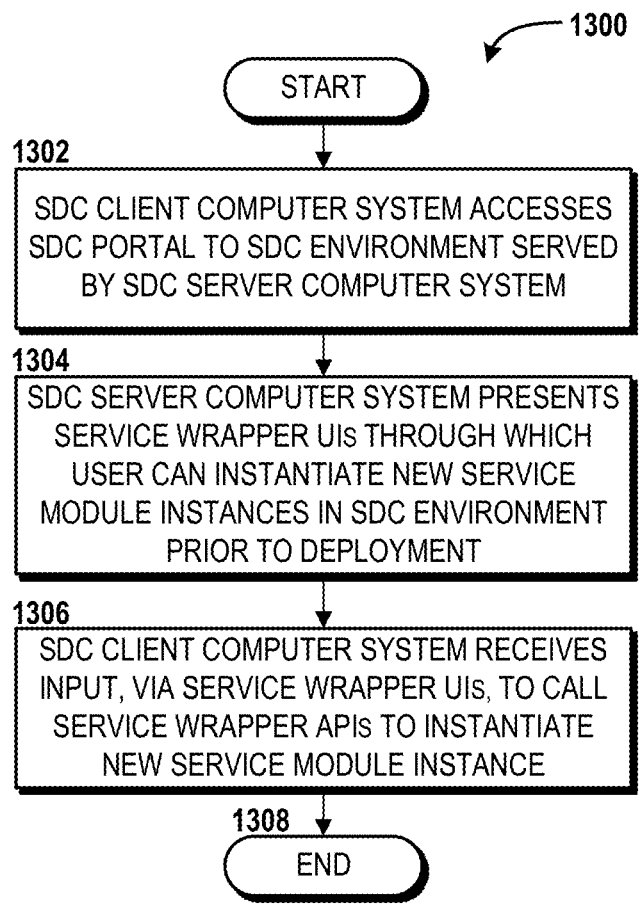
FIG. 13 is a flow diagram illustrating aspects of a method for instantiating a new service module, according to an illustrative embodiment.

Turning now to FIG. 13, aspects of a method 1300 for instantiating a new service module, such as the service module 1016, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of the SDC client computer system 1002, a processor of the SDC server computer system 1004, and/or a processor one or more other computing systems and/or devices disclosed herein to perform operations.

For purposes of illustrating and describing some of the concepts of the present disclosure, the methods disclosed herein are described as being performed, at least in part, by the SDC client computer system 1002 and the SDC server computer system 1004 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 1300 will be described with reference to FIG. 13 and further reference to FIG. 10. The method 1300 begins at operation 1302, where the SDC client computer system 1002 accesses the SDC portal 1012 to the SDC environment 1010 served by the SDC server computer system 1004. From operation 1302, the method 1300 proceeds to operation 1304, where the SDC server computer system 1004 presents the service wrapper UIs 1018 through which the user/user team 1008 can instantiate new service module instances in the SDC environment 1010 for development and testing prior to deployment. From operation 1304, the method 1300 proceeds to operation 1306, where the SDC client computer system 1002 receives input, via the service wrapper UIs 1018, to call the service wrapper APIs 1020 to instantiate a new service module instance, such as one of the service module instances 1014. From operation 1306, the method 1300 proceeds to operation 1308, where the method 1300 ends.

Figure 14:
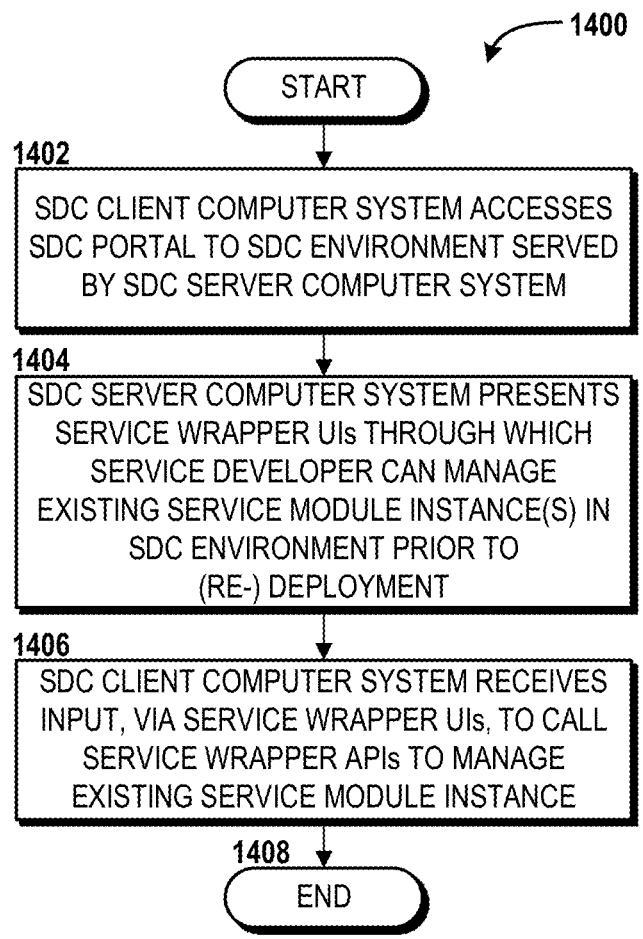
FIG. 14 is a flow diagram illustrating aspects of a method for managing an existing service module, according to an illustrative embodiment.

Turning now to FIG. 14, aspects of a method 1400 for managing an existing service module, such as the service module 1016, will be described, according to an illustrative embodiment. The method 1400 will be described with reference to FIG. 14 and further reference to FIG. 10. The method 1400 begins and proceeds to operation 1402, where the SDC client computer system 1002 accesses the SDC portal 1012 to the SDC environment 1010 that is served by the SDC server computer system 1004. From operation 1402, the method 1400 proceeds to operation 1404, where the SDC server computer system 1004 presents the service wrapper UIs 1018 through which the user/user team 1008 can manage one or more existing service module instances in the SDC environment 1010 prior to (re-) deployment. From operation 1404, the method 1400 proceeds to operation 1406, where the SDC client computer system 1002 receives input, via the service wrapper UIs 1018, to call the service wrapper APIs 1020 to manage the existing service module instances. From operation 1406, the method 1400 proceeds to operation 1408, where the method 1400 ends.

Figure 15:
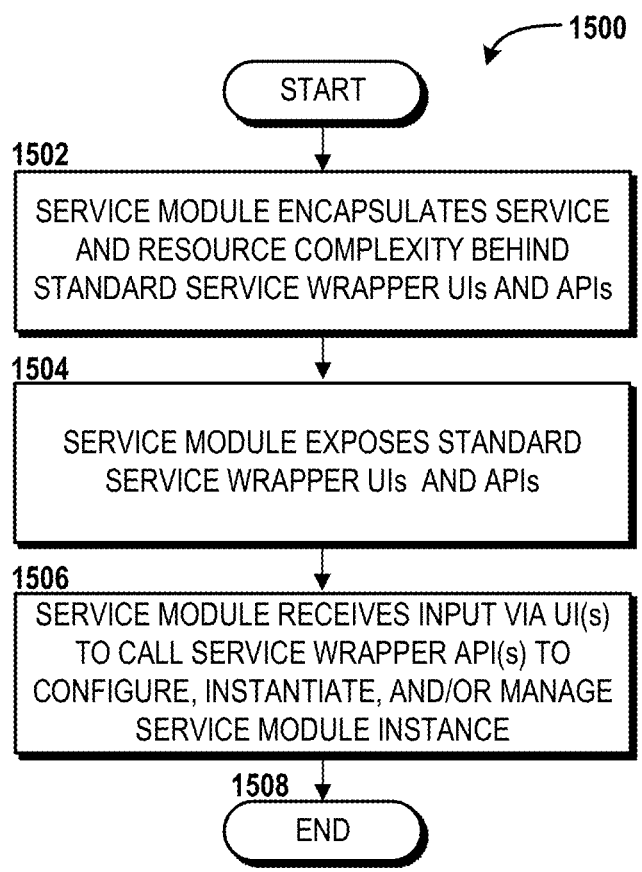
FIG. 15 is a flow diagram illustrating aspects of a method for implementing a service module, according to an illustrative embodiment.

Turning now to FIG. 15, aspects of a method 1500 for implementing a service module will be described, according to an illustrative embodiment. The method 1500 will be described with reference to FIG. 15 and further reference to FIG. 12. The method 1500 begins and proceeds to operation 1502, where a service module, such as the service module 1016 shown in FIG. 12, encapsulates service and resource complexity behind standard service wrapper UIs and APIs. From operation 1502, the method 1500 proceeds to operation 1504, where the service module 1016 exposes the standard service wrapper UIs and APIs. From operation 1504, the method 1500 proceeds to operation 1506, where the service module 1016 receives input via UI(s) to call service wrapper API(s) to configure, instantiate, and/or mange service module instances. From operation 1506, the method 1500 proceeds to operation 1508, where the method 1500 ends.

Figure 16:
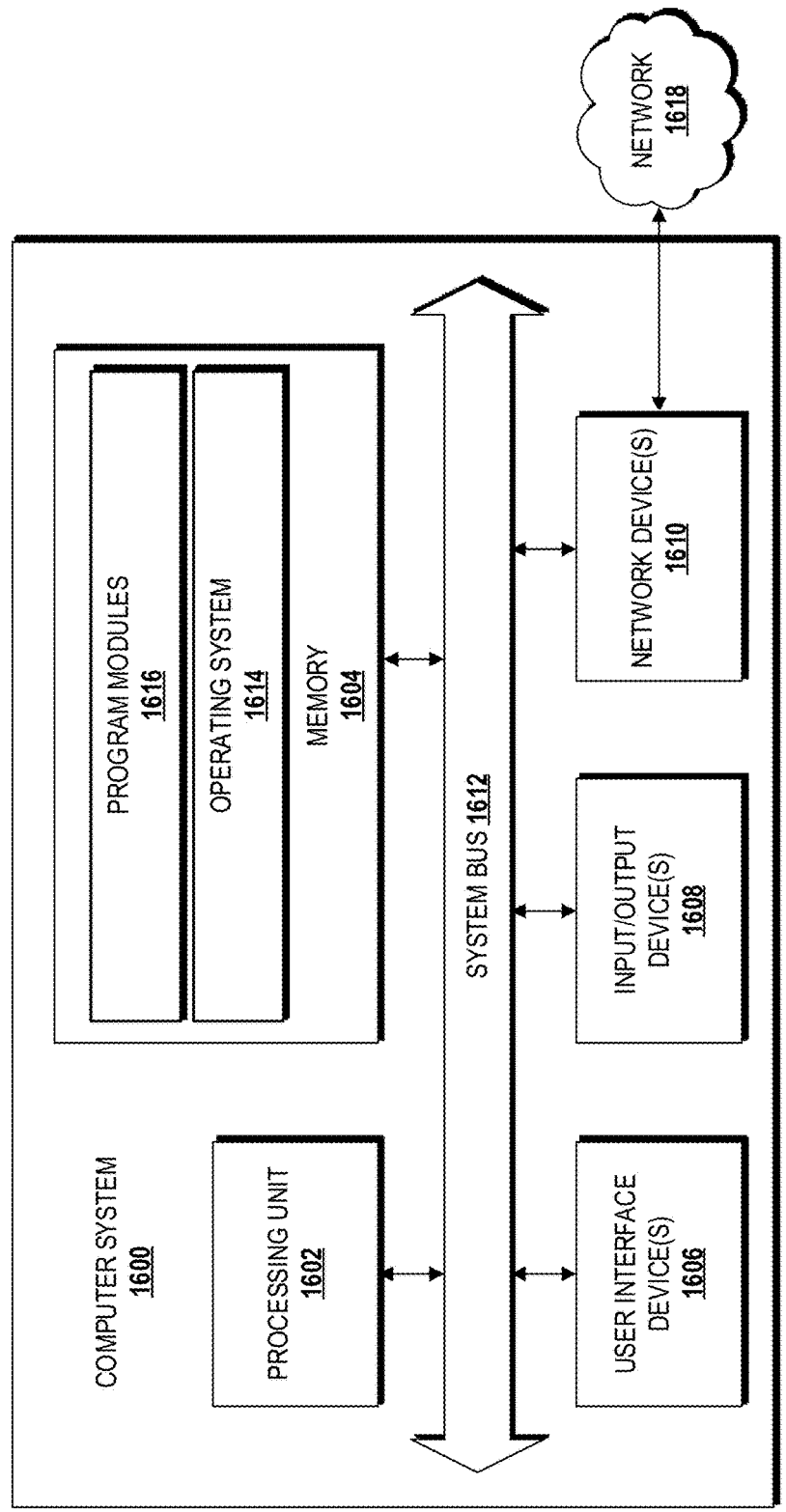
FIG. 16 is a block diagram illustrating an example computer system capable of implementing aspects of the embodiments presented herein.

Turning now to FIG. 16, a block diagram illustrating a computer system 1600 configured to provide the functionality in accordance with various embodiments of the concepts and technologies disclosed herein. In some implementations, the SDC client computer system 1002 and the SDC server computer system 1004 each include one or more computers that are configured like the architecture of the computer system 1600. It should be understood, however, that modification to the architecture may be made to facilitate certain interactions among elements described herein.

The computer system 1600 includes a processing unit 1602, a memory 1604, one or more user interface devices 1606, one or more input/output ("I/O") devices 1608, and one or more network devices 1610, each of which is operatively connected to a system bus 1612. The bus 1612 enables bi-directional communication between the processing unit 1602, the memory 1604, the user interface devices 1606, the I/O devices 1608, and the network devices 1610.

The processing unit 1602 may be a standard central processor that performs arithmetic and logical operations, a more specific purpose programmable logic controller ("PLC"), a programmable gate array, or other type of processor known to those skilled in the art and suitable for controlling the operation of the server computer. Processing units are generally known, and therefore are not described in further detail herein.

The memory 1604 communicates with the processing unit 1602 via the system bus 1612. In some embodiments, the memory 1604 is operatively connected to a memory controller (not shown) that enables communication with the processing unit 1602 via the system bus 1612. The illustrated memory 1604 includes an operating system 1614 and one or more program modules 1616. The operating system 1614 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, OS X, and/or iOS families of operating systems from APPLE CORPORATION, the FREEBSD family of operating systems, the SOLARIS family of operating systems from ORACLE CORPORATION, other operating systems, and the like.

The program modules 1616 may include various software and/or program modules to perform the various operations described herein. The program modules 1616 and/or other programs can be embodied in computer-readable media containing instructions that, when executed by the processing unit 1602, perform various operations such as those described herein. According to embodiments, the program modules 1616 may be embodied in hardware, software, firmware, or any combination thereof.

By way of example, and not limitation, computer-readable media may include any available computer storage media or communication media that can be accessed by the computer system 1600. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1600. In the claims, the phrase "computer storage medium" and variations thereof does not include waves or signals per se and/or communication media.

The user interface devices 1606 may include one or more devices with which a user accesses the computer system 1600. The user interface devices 1606 may include, but are not limited to, computers, servers, PDAs, cellular phones, or any suitable computing devices. The I/O devices 1608 enable a user to interface with the program modules 516. In one embodiment, the I/O devices 1608 are operatively connected to an I/O controller (not shown) that enables communication with the processing unit 1602 via the system bus 1612. The I/O devices 1608 may include one or more input devices, such as, but not limited to, a keyboard, a mouse, or an electronic stylus. Further, the I/O devices 1608 may include one or more output devices, such as, but not limited to, a display screen or a printer. In some embodiments, the I/O devices 1608 can be used for manual controls for operations to exercise under certain emergency situations.

The network devices 1610 enable the computer system 1600 to communicate with other networks or remote systems via a network 1618. Examples of the network devices 1610 include, but are not limited to, a modem, a radio frequency ("RF") or infrared ("IR") transceiver, a telephonic interface, a bridge, a router, or a network card. The network 1618 may be or may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1618 may be or may include a wired network such as, but not limited to, a Wide Area Network ("WAN"), a wired Personal Area Network ("PAN"), or a wired Metropolitan Area Network ("MAN"). The network 1618 may be or may include the network 1006.

Figure 17:
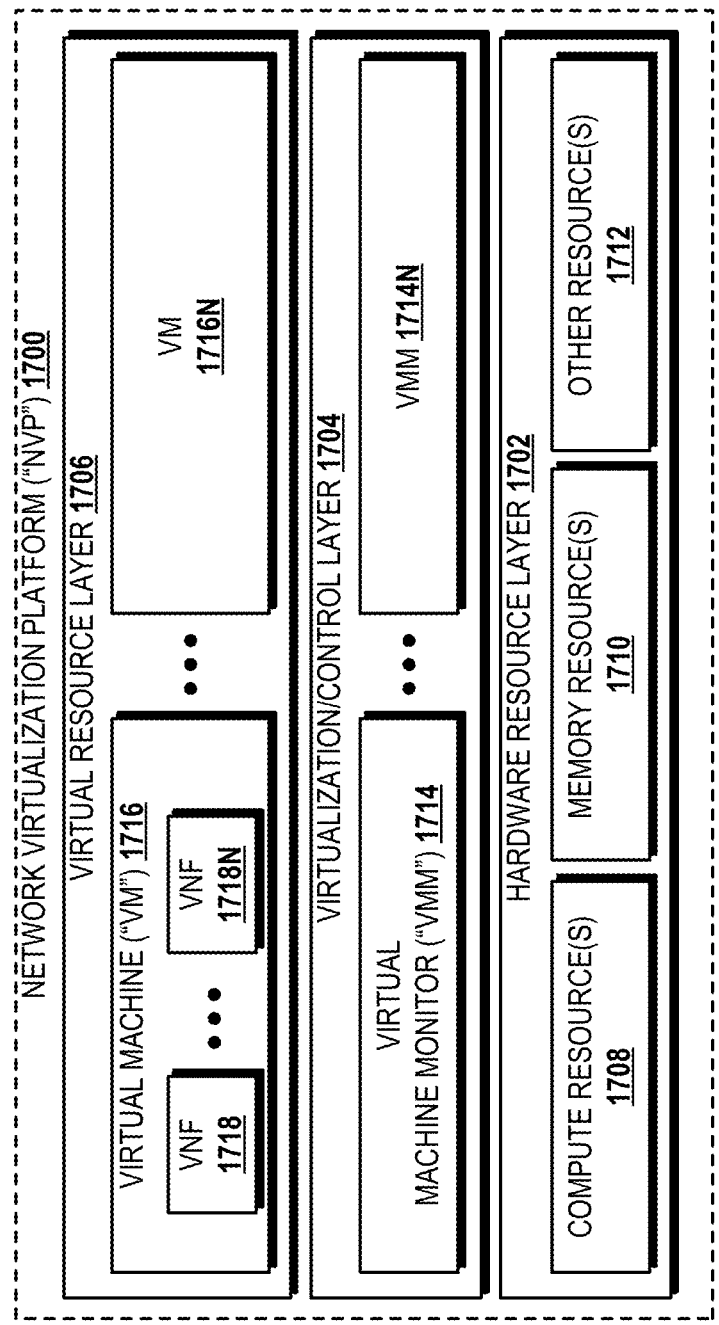
FIG. 17 is a block diagram illustrating an example network virtualization platform ("NVP") capable of implementing aspects of the embodiments presented herein.

Turning now to FIG. 17, a block diagram illustrating a network virtualization platform ("NVP") 1700 configured to provide the functionality in accordance with various embodiments of the concepts and technologies disclosed herein will be described. The architecture of the NVP 1700 can be used to implement virtualized infrastructure 808 introduced in FIG. 8. The NVP 1700 is a shared infrastructure that can support multiple services and network applications. The illustrated NVP 1700 includes a hardware resource layer 1702, a virtualization/control layer 1704, and a virtual resource layer 1706 that work together to perform operations described herein.

The hardware resource layer 1702 provides hardware resources, which, in the illustrated embodiment, include one or more compute resources 1708, one or more memory resources 1710, and one or more other resources 1712. The compute resource(s) 1708 can include one or more hardware components that perform computations to process data, and/or to execute computer-executable instructions of one or more application programs, operating systems, and/or other software. The compute resources 1708 can include one or more central processing units ("CPUs") configured with one or more processing cores. The compute resources 1708 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the compute resources 1708 can include one or more discrete GPUs. In some other embodiments, the compute resources 1708 can include CPU and GPU components that are configured in accordance with a co-processing CPU/GPU computing model, wherein the sequential part of an application executes on the CPU and the computationally-intensive part is accelerated by the GPU. The compute resources 1708 can include one or more system-on-chip ("SoC") components along with one or more other components, including, for example, one or more of the memory resources 1710, and/or one or more of the other resources 1712. In some embodiments, the compute resources 1708 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The compute resources 1708 can be or can include one or more hardware components architected in accordance with an ARM architecture, available for license from ARM HOLDINGS of Cambridge, United Kingdom. Alternatively, the compute resources 1708 can be or can include one or more hardware components architected in accordance with an x86 architecture, such an architecture available from INTEL CORPORATION of Mountain View, Calif., and others. Those skilled in the art will appreciate the implementation of the compute resources 1708 can utilize various computation architectures, and as such, the compute resources 1708 should not be construed as being limited to any particular computation architecture or combination of computation architectures, including those explicitly disclosed herein.

The memory resource(s) 1710 can include one or more hardware components that perform storage operations, including temporary or permanent storage operations. In some embodiments, the memory resource(s) 1710 include volatile and/or non-volatile memory implemented in any method or technology for storage of information such as computer-readable instructions, data structures, program modules, or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the compute resources 1708.

The other resource(s) 1712 can include any other hardware resources that can be utilized by the compute resources(s) 1708 and/or the memory resource(s) 1710 to perform operations described herein. The other resource(s) 1712 can include one or more input and/or output processors (e.g., network interface controller or wireless radio), one or more modems, one or more codec chipset, one or more pipeline processors, one or more fast Fourier transform ("FFT") processors, one or more digital signal processors ("DSPs"), one or more speech synthesizers, and/or the like.

The hardware resources operating within the hardware resources layer 1702 can be virtualized by one or more virtual machine monitors ("VMMs") 1714-1714N (also known as "hypervisors"; hereinafter "VMMs 1714") operating within the virtualization/control layer 1704 to manage one or more virtual resources that reside in the virtual resource layer 1706. The VMMs 1714 can be or can include software, firmware, and/or hardware that alone or in combination with other software, firmware, and/or hardware, manages one or more virtual resources operating within the virtual resource layer 1706.

The virtual resources operating within the virtual resource layer 1706 can include abstractions of at least a portion of the compute resources 1708, the memory resources 1710, the other resources 1712, or any combination thereof. These abstractions are referred to herein as virtual machines ("VMs"). In the illustrated embodiment, the virtual resource layer 1706 includes VMs 1716-1716N (hereinafter "VMs 1716"). Each of the VMs 1716 can execute one or more applications, including VNFs 1718, such as the VNFs.

Based on the foregoing, it should be appreciated that concepts and technologies directed to recursive modularization of service provider components to reduce service delivery time and cost have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

We claim:

1. A computer-readable storage medium having instructions stored thereon that, when executed by a processor, cause the processor to perform operations comprising:
encapsulating a first module with a second module, wherein the first module is a virtual network function module, wherein the first module comprises service module implementation logic encapsulated behind a set of application programming interfaces of the first module and behind a set of user interfaces of the first module through which the set of application programming interfaces of the first module are callable, wherein the set of application programming interfaces of the first module comprises a first application programming interface and a second application programming interface, and wherein the second module leverages the set of application programming interfaces of the first module and the set of user interfaces of the first module to offer a set of application interfaces of the second module and a set of user interfaces of the second module in response to encapsulating the first module with the second module;
exposing, via a module controller, the set of application programming interfaces of the second module and the set of user interfaces of the second module; and
receiving, via the set of user interfaces of the second module, input to call at least a portion of the set of application programming interfaces of the second module to instantiate a module instance of the first module encapsulated by the second module, wherein the first application programming interface comprises a configuration application programming interface that collects a configuration for the module instance, and wherein the second application programming interface comprises an instance provisioning application programming interface that instantiates the module instance based upon the configuration.

2. The computer-readable storage medium of claim 1, wherein the module instance is a new service module instance.

3. The computer-readable storage medium of claim 1, wherein receiving, via the set of user interfaces of the second module, the input to call at least the portion of the set of application programming interfaces of the second module is further to manage an existing service module instance.

4. The computer-readable storage medium of claim 1, wherein the set of application programming interfaces of the first module further comprises an event listener application programming interface that receives an event generated by a service module instance and provides the event to an event handler.

5. The computer-readable storage medium of claim 1, wherein the set of user interfaces of the first module comprises:
a configuration user interface through which a user provides the input to configure a service module instance, and
an instance provisioning user interface through which the user instantiates the service module instance.

6. A system comprising:
a processor; and
memory that stores instructions that, when executed by the processor, causes the processor to perform operations comprising:
encapsulating a first module with a second module, wherein the first module is a virtual network function module, wherein the first module comprises service module implementation logic behind a set of application programming interfaces of the first module and behind a set of user interfaces of the first module through which the set of application programming interfaces of the first module are callable, wherein the set of application programming interfaces of the first module comprises a first application programming interface and a second application programming interface, and wherein the second module leverages the set of application programming interfaces of the first module and the set of user interfaces of the first module to offer a set of application interfaces of the second module and a set of user interfaces of the second module in response to encapsulating the first module with the second module,
exposing, via a module controller, the set of application programming interfaces of the second module and the set of user interfaces of the second module, and
receiving, via the set of user interfaces of the second module, input to call at least a portion of the set of application programming interfaces of the second module to instantiate a module instance of the first module encapsulated by the second module, wherein the first application programming interface comprises a configuration application programming interface that collects a configuration for the module instance, and wherein the second application programming interface comprises an instance provisioning application programming interface that instantiates the module instance based upon the configuration.

7. The system of claim 6, wherein the module instance is a new service module instance.

8. The system of claim 6, wherein receiving, via the set of user interfaces of the second module, the input to call at least the portion of the set of application programming interfaces of the second module is further to manage an existing service module instance.

9. The system of claim 6, wherein the set of application programming interfaces of the first module further comprises an event listener application programming interface that receives an event generated by a service module instance and provides the event to an event handler.

10. The system of claim 6, wherein the module instance is a service module instance.

11. The system of claim 10, wherein the set of user interfaces of the first module comprises a configuration user interface through which a user provides the input to configure the service module instance.

12. The system of claim 11, wherein the set of user interfaces of the first module further comprises an instance provisioning user interface through which the user instantiates the service module instance.

13. A method comprising:
encapsulating, by a system comprising a processor that executes a module controller, a first module with a second module, wherein the first module is a virtual network function module, wherein the first module comprises service module implementation logic behind a set of application programming interfaces of the first module and behind a set of user interfaces of the first module through which the set of application programming interfaces of the first module are callable, wherein the set of application programming interfaces of the first module comprises a first application programming interface and a second application programming interface, and wherein the second module leverages the set of application programming interfaces of the first module and the set of user interfaces of the first module to offer a set of application interfaces of the second module and a set of user interfaces of the second module in response to encapsulating the first module with the second module;

exposing, by the system, via the module controller, the set of application programming interfaces of the second module and the set of user interfaces of the second module; and receiving, by the system, via the set of user interfaces of the second module, input to call at least a portion of the set of application programming interfaces of the second module to instantiate a module instance of the first module encapsulated by the second module, wherein the first application programming interface comprises a configuration application programming interface that collects a configuration for the module instance, and wherein the second application programming interface comprises an instance provisioning application programming interface that instantiates the module instance based upon the configuration.

14. The method of claim 13, wherein the module instance is a new service module instance.

15. The method of claim 13, wherein receiving, by the system, via the set of user interfaces of the second module, the input to call at least the portion of the set of application programming interfaces of the second module is further to manage an existing service module instance.

16. The method of claim 13,
wherein the set of user interfaces of the first module comprises:
a configuration user interface through which a user provides the input to configure a service module instance, and
an instance provisioning user interface through which the user instantiates the service module instance.

17. The method of claim 16, wherein the set of application programming interfaces of the first module further comprises an event listener application programming interface that receives an event generated by the service module instance and provides the event to an event handler.

* * * * *